United States Patent
Mayster et al.

(10) Patent No.: US 12,072,928 B2
(45) Date of Patent: Aug. 27, 2024

(54) FINDING LOCALLY PROMINENT SEMANTIC FEATURES FOR NAVIGATION AND GEOCODING

(71) Applicant: Google LLC, Mountain View, CA (US)

(72) Inventors: Yan Mayster, Aurora, CO (US); Brian Brewington, Superior, CO (US); Matthew Strosnick, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/977,777

(22) PCT Filed: Oct. 22, 2018

(86) PCT No.: PCT/US2018/056854
§ 371 (c)(1),
(2) Date: Sep. 2, 2020

(87) PCT Pub. No.: WO2020/086051
PCT Pub. Date: Apr. 30, 2020

(65) Prior Publication Data
US 2021/0240762 A1    Aug. 5, 2021

(51) Int. Cl.
*G06F 16/9535* (2019.01)
*G06F 16/583* (2019.01)
(Continued)

(52) U.S. Cl.
CPC .......... *G06F 16/587* (2019.01); *G06F 16/583* (2019.01); *G06V 20/56* (2022.01)

(58) Field of Classification Search
CPC ...... G06F 16/587; G06F 16/583; G06F 16/29; G06V 20/56; G01C 21/3644; G06K 9/00791
See application file for complete search history.

(56) References Cited

U.S. PATENT DOCUMENTS 9,464,914 B1 * 10/2016 Mizuno .............. G01C 21/3679
9,495,614 B1 * 11/2016 Boman ................... G06F 16/29
(Continued)

FOREIGN PATENT DOCUMENTS

| CN | 108628919 | 10/2018 |
|---|---|---|
| JP | 2008/070557 | 3/2008 |
| WO | WO 2017/209878 | 12/2017 |

OTHER PUBLICATIONS

International Search Report for PCT/US2018/056854, mailed on Dec. 11, 2018, 2 pages.
(Continued)

*Primary Examiner* — Apu M Mofiz
*Assistant Examiner* — Oscar Wehovz
(74) *Attorney, Agent, or Firm* — DORITY & MANNING P.A.

(57) ABSTRACT

Provided are methods, systems, devices, apparatuses, and tangible non-transitory computer readable media for navigation and geocoding. The disclosed technology can perform operations including accessing semantic tags associated with images. Each of the semantic tags can be associated with features depicted by one of the images. Further, each of the features can be associated with a geographic location. Based on the semantic tags, landmarks that include the features that satisfy entropic criteria can be identified. The entropic criteria can measure a localized prominence of each of the one or more features. A landmark for use in navigation at the location can be selected based on context data associated with a location on a path that includes a plurality of locations. Furthermore, at least one navigational instruction that references the landmark can be generated.

18 Claims, 12 Drawing Sheets

(51) Int. Cl.
  *G06F 16/587*  (2019.01)
  *G06F 16/951*  (2019.01)
  *G06V 20/56*  (2022.01)

(56) References Cited

U.S. PATENT DOCUMENTS

| | | |
|---|---|---|
| 10,101,744 B2 | 10/2018 | Reisman et al. |
| 11,222,044 B2 | 1/2022 | El-Saban et al. |
| 2007/0016368 A1* | 1/2007 | Chapin .............. G01C 21/3644 |
| | | 701/426 |
| 2010/0324818 A1* | 12/2010 | Gellatly ............. G01C 21/3641 |
| | | 701/431 |
| 2014/0274022 A1* | 9/2014 | Bell ........................ G06F 16/35 |
| | | 455/418 |
| 2016/0153789 A1* | 6/2016 | Gallar ................ G01C 21/3635 |
| | | 701/400 |
| 2016/0349059 A1* | 12/2016 | McGuire ........... G01C 21/3848 |
| 2017/0010618 A1* | 1/2017 | Shashua ................ B60W 60/00 |
| 2017/0307396 A1* | 10/2017 | So ...................... G01C 21/3484 |
| 2017/0314954 A1* | 11/2017 | Golding ............ G01C 21/3644 |
| 2017/0350719 A1 | 12/2017 | Moore et al. |
| 2018/0045519 A1* | 2/2018 | Ghadiok ............. G06F 16/2379 |
| 2018/0112993 A1* | 4/2018 | Schpok ............. G01C 21/3664 |
| 2021/0171023 A1* | 6/2021 | Shalev-Shwartz .... B60W 10/18 |

OTHER PUBLICATIONS

Chinese Search Report Corresponding to Application No. 2018800922424 on Dec. 9, 2023.

\* cited by examiner

FINDING LOCALLY PROMINENT SEMANTIC FEATURES FOR NAVIGATION AND GEOCODING

PRIORITY CLAIM

This application is based upon and claims the right of priority under 35 U.S.C. § 371 to International Application No. PCT/US2018/056854 filed on Oct. 22, 2018. Applicant claims priority to and the benefit of each of such applications and incorporates all such applications herein by reference in their entirety.

FIELD

The present disclosure relates generally to navigation and geocoding. More particularly, the present disclosure relates to determining locally prominent semantic features using a computing device.

BACKGROUND

Operations associated with the state of a geographic area can be implemented on a variety of computing devices. These operations can include processing data associated with the geographic area for later access and use by a user or computing system. Further, the operations can include exchanging data with remote computing systems. However, the types of operations and the way in which the operations are performed can vary over time, as can the underlying hardware that implements the operations. Accordingly, there are different ways to leverage computing resources associated with the state of a geographic area.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method of providing navigational instructions that reference landmarks. The computer-implemented method can include accessing, by a computing system including one or more processors, a plurality of semantic tags associated with a plurality of images. Each of the plurality of semantic tags can be associated with one or more features depicted by one of the plurality of images. Further, each of the one or more features can be associated with a geographic location. The computer-implemented method can include identifying, by the computing system, based at least in part on the plurality of semantic tags, one or more landmarks that include the one or more features that satisfy one or more entropic criteria that measure a localized prominence of each of the one or more features. The computer-implemented method can also include selecting, by the computing system, based at least in part on context data associated with a location on a path including a plurality of locations, at least one landmark for use in navigation at the location. Furthermore, the computer-implemented method can include generating, by the computing system, at least one navigational instruction that references the at least one landmark.

Another example aspect of the present disclosure is directed to one or more tangible non-transitory computer-readable media storing computer-readable instructions that when executed by one or more processors cause the one or more processors to perform operations. The operations can include accessing image data including a plurality of images associated with one or more semantic tags. Each of the one or more semantic tags can be associated with one or more features of the plurality of images. Further, each of the one or more features can be associated with a geographic location. The operations can also include determining one or more landmarks including the one or more features that satisfy one or more entropic criteria associated with a localized prominence of each of the one or more features. The operations can include determining, based at least in part on context data associated with a location of a vantage point on a path including a plurality of locations, the one or more landmarks associated with the vantage point. Furthermore, the operations can include generating navigational data including one or more indications associated with the one or more landmarks.

Another example aspect of the present disclosure is directed to a computing system including: one or more processors; and one or more non-transitory computer-readable media storing instructions that when executed by the one or more processors cause the one or more processors to perform operations. The operations can include accessing image data including a plurality of images associated with one or more semantic tags. Each of the one or more semantic tags can be associated with one or more features of the plurality of images. Further, each of the one or more features can be associated with a geographic location. The operations can include determining one or more landmarks including the one or more features that satisfy one or more entropic criteria associated with a localized prominence of each of the one or more features. The operations can also include determining, based at least in part on context data associated with a location of a vantage point on a path including a plurality of locations, the one or more landmarks associated with the vantage point. Furthermore, the operations can include generating navigational data including one or more indications associated with the one or more landmarks.

Other aspects of the present disclosure are directed to various systems, apparatuses, non-transitory computer-readable media, user interfaces, and electronic devices. These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
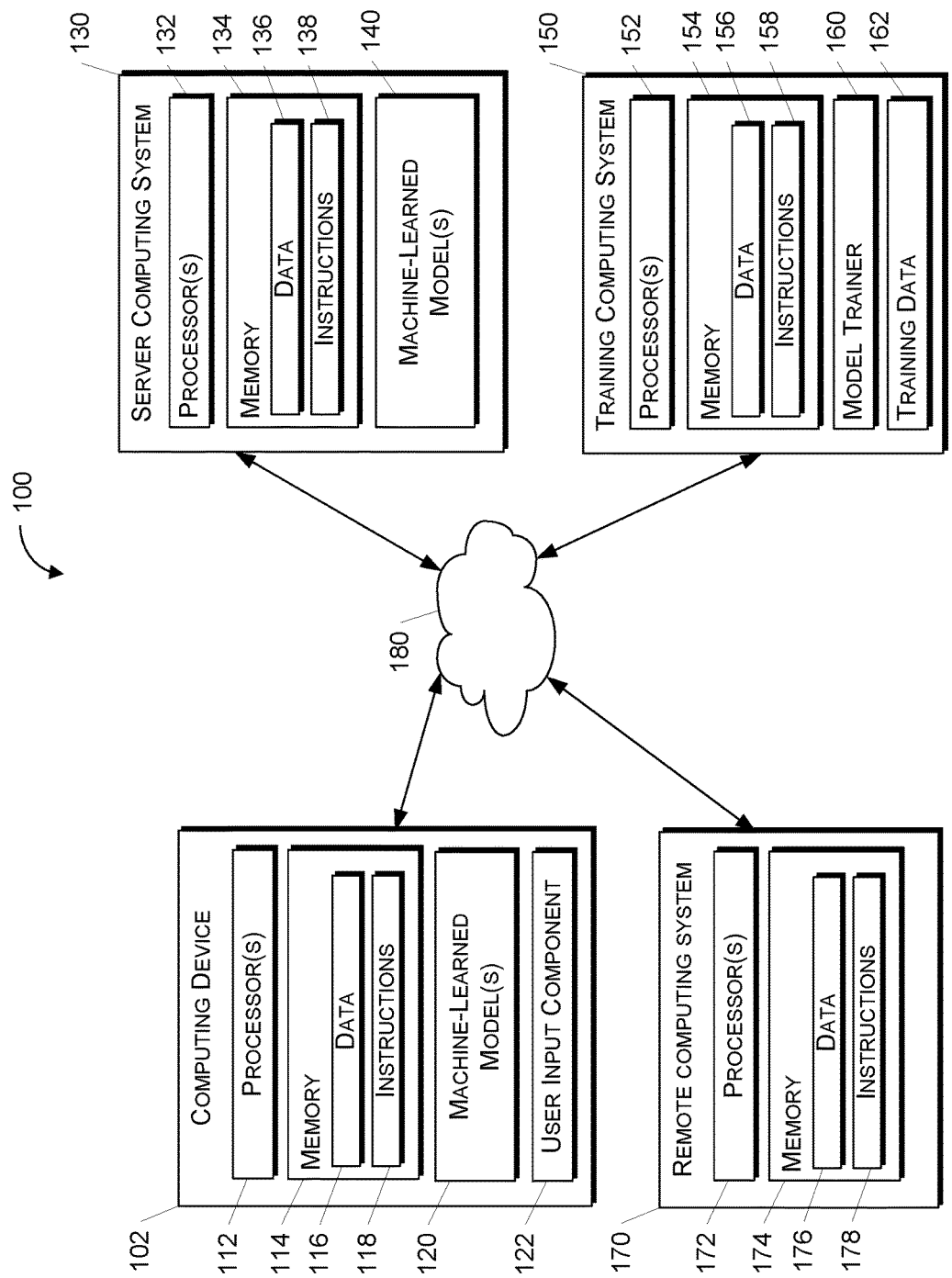
FIG. 1 depicts a diagram of an example system according to example embodiments of the present disclosure.

Reference numerals that are repeated across plural figures are intended to identify the same features in various implementations.

DETAILED DESCRIPTION

Generally, the present disclosure is directed to the determination of landmarks for use in navigation and geocoding. Further, the present disclosure describes the generation of navigational instructions based on the determined landmarks. In particular, the disclosed technology can include a computing system that receives data including semantic tags associated with features of images (e.g., photographs of an area captured from various vantage points). The semantic tags can be based on images that have been processed by a machine-learned model or other image content analysis system that detected and identified the features of the images. Further, the features of the images can be associated with a geographic location (e.g., altitude, latitude, and longitude) and other information (e.g., a time at which each image was captured). The computing system can then determine landmarks in the images that include features that satisfy entropic criteria associated with the localized prominence of the features (e.g., the visibility, rarity, or familiarity of the feature within the area). The computing system can also determine, based on context data associated with a vantage point (e.g., a current location of the computing system or a user of the computing system), the landmarks associated with the vantage point (e.g., landmarks that are visible from the vantage point). Furthermore, the computing system can generate indications (e.g., navigational instructions that reference the landmark(s)) that can be used to facilitate navigation. As such, the disclosed technology can more effectively determine the location of landmarks in an environment and select a portion of the landmarks that will facilitate more effective navigation based on a given context and vantage point. The technology described herein may thus enable users to navigate more effectively and/or efficiently to a specified location. In some examples, the landmarks determined in the manner described herein may be referenced in a series of turn-by-turn navigational instructions which may be provided to a driver of a vehicle. The described technology may thus assist the driver in performing more effectively the technical task of driving the vehicle to a specified location by means of a continued and/or guided human-vehicle interaction process.

By way of further example, a computing system (e.g., a computing system in a vehicle) can access map data (e.g., locally stored or remotely accessible map data) associated with a geographic area. The map data can include images and semantic tags that indicate features of the images that have been previously identified using image recognition (e.g., a machine-learned model trained to detect features of images). The computing system can then determine a set of landmarks in the area that include a set of features that satisfy entropic criteria associated with the localized prominence of the landmarks. For example, a thirty meter tall red-granite obelisk can satisfy entropic criteria (e.g., large size, unusual shape, and unusual color) that a parking meter (e.g., relatively small size and very common) or bush would not. Additionally, the computing system can determine a context that includes the time of day, location, and direction of travel (e.g., the direction of travel of the vehicle) that can be used to select the most effective landmark for the given vantage point and conditions in the area. The computing device can then use the landmarks within the area to provide a set of instructions (e.g., audible instructions generated through a vehicle loudspeaker and/or textual or graphical instructions provided on a display) to a user to assist in navigation. As such, the disclosed technology provides a variety of improvements in navigation and geocoding.

Figure 2:
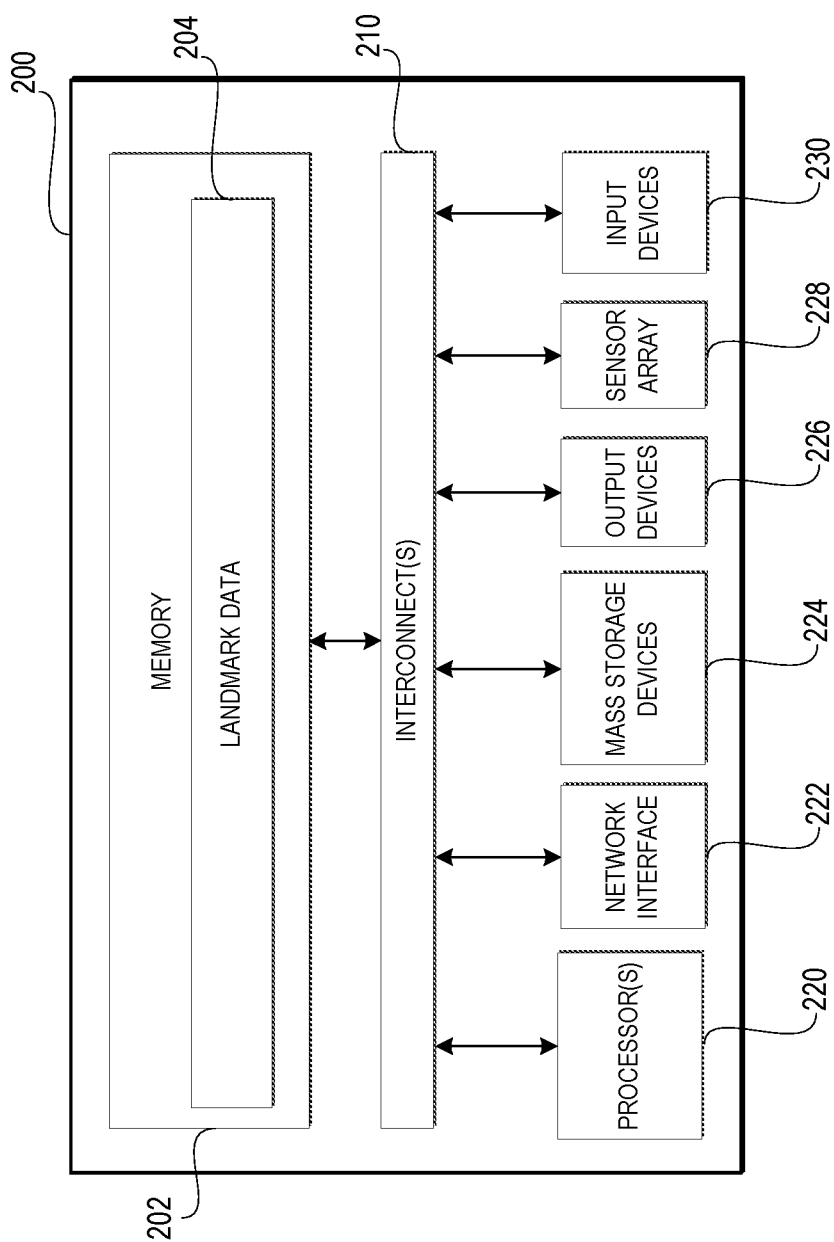
FIG. 2 depicts a diagram of an example device according to example embodiments of the present disclosure.

In some embodiments, the disclosed technology can include a computing system (e.g., a navigation computing system) that can include one or more computing devices (e.g., devices with one or more computer processors and a memory that can store one or more instructions) that can send, receive, process, generate, and/or modify data (e.g., data including semantic tags associated with images) including one or more information patterns or structures that can be stored on one or more memory devices (e.g., one or more random access memory devices) and/or one or more storage devices (e.g., one or more hard disk drives and/or one or more solid state memory drives); and/or one or more signals (e.g., electronic signals). The data and/or one or more signals can be exchanged by the computing system with various other systems and/or devices including a plurality of service systems (e.g., one or more remote computing systems, one or more remote computing devices, and/or one or more software applications operating on one or more computing devices) that can send and/or receive data including data including semantic tags associated with images (e.g., digital images associated with data including geographic location, time of image capture, and/or one or more descriptions of one or more other features of the images). In some embodiments, the computing system (e.g., the navigation computing system) can include one or more features of the device 102 that is depicted in FIG. 1 and/or the computing device 200 that is depicted in FIG. 2. Further, the network computing system can be associated with one or more machine-learned models that include one or more features of the one or more machine-learned models 120 that are depicted in FIG. 1

Furthermore, the computing system can include specialized hardware (e.g., an application specific integrated circuit) and/or software that enables the computing system to perform one or more operations specific to the disclosed technology including accessing semantic tags (e.g., accessing locally stored semantic tags or accessing semantic tags by receiving the semantic tags from a remote computing device) associated with a plurality of images, determining landmarks that include one or more features that satisfy entropic criteria, using context data to determine landmarks associated with a vantage point, and generating navigational data.

More particularly, a navigation computing system can receive a plurality of semantic tags associated with a plurality of images. Each semantic tag of the plurality of semantic tags can be associated with one or more features depicted by one of the plurality of images. For example, each semantic tag can provide a semantic description of an object included within a scene depicted by one of the plurality of images. Further, each feature of the one or more features can be associated with a geographic location. The plurality of images can include one or more digital images (e.g., a two dimensional image) of a portion of an environment (e.g., an image of a location in an environment). The plurality of images can be encoded in any type of image format including a combination of raster images (e.g., bitmaps comprising a grid of pixels) and/or vector images (e.g., polygonal representations of images based on positions of coordinates including x and y axes of a two-dimensional plane). The images can include still images, image frames from a movie, and/or other types of imagery including LIDAR imagery, RADAR imagery, and/or other types of imagery.

Examples of digital image formats used by the plurality of images can include JPEG (Joint Photographic Experts Group), BMP (Bitmap), TIFF (Tagged Image File Format), PNG (Portable Network Graphics), and/or GIF (Graphics Interchange Format). The images can be collected from various sources such as user-submitted imagery, imagery in public domain (e.g., obtained via web crawl and properly aggregated and anonymized), street-level panoramic imagery, and/or other sources of images.

The plurality of semantic tags associated with the images can be associated with one or more features including: physical dimensions (e.g., physical dimensions of objects in an image); and/or object identities (e.g., the identity of objects depicted in the one or more images). Additional information can be associated with the images and/or semantic tags such as: a location (e.g., a street address and/or an altitude, latitude, and longitude associated with an image); a time of day (e.g., a time of day when an image was captured); a date (e.g., a date when an image was captured);

By way of example, the navigation computing system can receive data including information associated with the plurality of semantic tags and the plurality of images via a communication network (e.g., a wireless and/or wired network including a LAN, WAN, or the Internet) through which one or more signals (e.g., electronic signals) and/or data can be sent and/or received.

The navigation computing system can identify, based at least in part on the plurality of semantic tags, one or more landmarks that include the one or more features that satisfy one or more entropic criteria that measure a localized prominence of each of the one or more features. For example, the navigation computing system can access data associated with the plurality of semantic tags that indicates the one or more landmarks in an area. Further, the one or more landmarks can be associated with one or more features (e.g., physical dimensions or shape) that can be compared to one or more entropic criteria that can be used to identify the one or more landmarks. The one or more entropic criteria can be associated with the frequency with which each of the one or more features occurs in the area or the distinctiveness of each feature from other common features in the area.

Satisfaction of the one or more entropic criteria can be based, for example, on a feature being infrequent (e.g., the only tree in an area or the only high-rise building in an area). Thus, in one example, clustering or other algorithmic techniques can be used to determine a rarity or infrequency associated with each feature, which can then be used to guide selection of features for use as landmarks. As one example, for each location, an area around the location can be analyzed to identify which features associated with the location are most rare (e.g., a histogram of semantic tags in an area around a location might reveal that an obelisk only occurs once while a mailbox occurs sixty times, thereby indicating that the obelisk would be better suited for use as a landmark). By way of further example, satisfaction of the one or more entropic criteria can include the distinctiveness of various characteristics of a feature with respect to other similar features in the area (e.g., although they may all be "buildings," a small house on one corner of a four sided intersection will contrast with high-rise buildings on the other three corners).

Landmarks thus can be determined from the semantic tag statistics aggregated geographically and over time for each location by focusing on "tags" of high entropy, i.e. those that appear to persist in time and exhibit highly localized prominence. Thus, the system can identify tags that are high confidence at the location, but comparatively unusual or rare in the surrounding area.

The navigation computing system can select, based at least in part on context data associated with a location on a path including a plurality of locations, at least one landmark for use in navigation at the location. For example, the navigation computing system can determine a context including the time of day, season, and/or an amount of traffic proximate to a vantage point. Based on, for example, context indicating that night has fallen, the navigation computing system can select a landmark that is illuminated and not cloaked in darkness.

The navigation computing system can generate at least one navigational instruction that references the at least one landmark. The at least one navigational instruction can include one or more visual instructions (e.g., text displayed on a display device) and/or one or more audible instructions (e.g., instructions emitted from an audio output device). For example, the navigation computing system can generate audible instructions describing the appearance of a landmark (e.g., "a statue of a horse with rider") and the location of the landmark (e.g., "on your right at the next intersection").

In some embodiments, determining, based at least in part on the plurality of semantic tags, a rate at which each of the one or more features occurs within a predetermined area can be used in identifying, based at least in part on the plurality of semantic tags, one or more landmarks that include the one or more features that satisfy one or more entropic criteria that measure a localized prominence of each of the one or more features. For example, the navigation computing system can determine the rate at which each of the one or more features (e.g., the height of high-rise buildings) occurs within a two-hundred square meter area.

In some embodiments, determining that the one or more landmarks include the one or more features that occur the least frequently or that occur at a rate below a threshold rate can be used in identifying, based at least in part on the plurality of semantic tags, one or more landmarks that include the one or more features that satisfy one or more entropic criteria that measure a localized prominence of each of the one or more features. For example, in determining a building to use as a landmark among a group of buildings, the navigation computing system can determine that the building with a height that occurs less frequently than an average rate of heights (e.g., a very tall high-rise building with a height that is in a height range that occurs once in every thousand high-rise buildings).

In some embodiments, determining a confidence score for each of the one or more features based at least in part on a number of times that each respective feature of the one or more features has been associated with a semantic tag of the plurality of semantic tags can be used in identifying, based at least in part on the plurality of semantic tags, one or more landmarks that include the one or more features that satisfy one or more entropic criteria that measure a localized prominence of each of the one or more features. For example, the navigation computing system can access data associated with the number of times that each feature of the one or more features has been tagged with the same tag. A feature that is tagged with the same feature a greater number of times can be associated with a higher confidence score.

In some embodiments, identifying as a landmark, the one or more features with a confidence score that satisfy one or more confidence score criteria can be used in identifying, based at least in part on the plurality of semantic tags, one or more landmarks that include the one or more features that satisfy one or more entropic criteria that measure a localized prominence of each of the one or more features. For example, the navigation computing system can identify as a landmark, the one or more features with a confidence score that exceeds a threshold confidence score.

In some embodiments, the confidence score can be based at least in part on a number of different perspectives from which each of the one or more features associated with a semantic tag has been viewed (e.g., semantic tags associated with images of the same object viewed from different angles), and/or a recency with which the one or more features have been associated with a semantic tag.

In some embodiments, determining one or more clusters of the one or more features that satisfy the one or more entropic criteria can be used in identifying, based at least in part on the plurality of semantic tags, one or more landmarks that include the one or more features that satisfy one or more entropic criteria that measure a localized prominence of each of the one or more features. Further, each of the one or more clusters can include the one or more features that have a common semantic type. For example, the navigation computing system can determine clusters of trees that can satisfy one or more entropic criteria associated with a tree density for the cluster of trees (e.g., the number of trees within a predetermined area).

In some embodiments, determining a visibility of each of the one or more landmarks from the vantage point associated with the location can be used in selecting, by the computing system, based at least in part on context data associated with a location on a path including a plurality of locations, at least one landmark for use in navigation at the location. Further, the context data can include a vantage point (e.g., a point within the location from which portions of the surrounding environment can be viewed) associated with the location. For example, the navigation computing system can determine the one or more landmarks that are visible from the vantage point based in part on how far away the landmark is and whether the landmark is obstructed by other objects.

In some embodiments, the visibility can be based at least in part on a distance from which each of the one or more landmarks is visible from the vantage point, an amount of light that is cast on each of the one or more landmarks, any obstructions between the vantage point and the one or more landmarks, and/or physical dimensions of each of the one or more landmarks.

In some embodiments, determining a direction of travel along the path at the vantage point can be used in determining a visibility of each of the one or more landmarks from the vantage point associated with the location. For example, the visibility of each of the one or more landmarks can be associated with a field of view from the vantage point that is associated with the direction of travel (e.g., a field of view equal to a predetermined angle relative to a line corresponding to the direction of travel).

In some embodiments, determining, the one or more landmarks that face the direction of travel can be used in determining a visibility of each of the one or more landmarks from the vantage point associated with the location. For example, the navigation computing system can determine that the one or more landmarks that face the direction of travel (e.g., the one or more landmarks that are ahead of the vantage point) are more visible than the one or more landmarks that do not face the direction of travel (e.g., the one or more landmarks that are behind the vantage point).

In some embodiments, determining the visibility based at least in part on a mode of transportation associated with the vantage point can be used in determining a visibility of each of the one or more landmarks from the vantage point associated with the location. For example, the navigation computing system can determine that under certain circumstances (e.g., on a street with heavy traffic) the visibility from an automobile is less than the visibility from a bicycle and determine the visibility accordingly.

In some embodiments, determining a reaction time based at least in part on a velocity at the location and a distance to a closest landmark of the one or more landmarks can be used in selecting, based at least in part on context data associated with the location on the path including the plurality of locations, at least one landmark for use in navigation at the location. For example, the navigation computing system can determine the reaction time based on the velocity at the location (e.g., a velocity in meters per second) and the distance to the closest landmark (e.g., a distance in meters).

In some embodiments, determining the one or more landmarks that satisfy one or more reaction time criteria associated with a minimum reaction time can be used in selecting, based at least in part on context data associated with the location on the path including the plurality of locations, at least one landmark for use in navigation at the location. For example, the navigation computing system can determine that the minimum reaction time is two seconds and that the one or more landmarks are selected from the one or more landmarks that will be visible after two seconds.

In some embodiments, the reaction time can be based at least in part on a mode of transportation associated with the vantage point. Furthermore, the mode of transportation can include a motor vehicle, a bicycle, and/or foot travel. For example, the reaction time for a slower mode of transportation (e.g., foot travel) can be of shorter duration than the reaction time for a faster mode of transportation (e.g., a motor vehicle).

In some embodiments, selecting the at least one landmark based at least in part on a level of familiarity with the one or more landmarks can be used in selecting, based at least in part on context data associated with the location on the path including the plurality of locations, at least one landmark for use in navigation at the location. Further, the level of familiarity can be associated with a number of times and/or frequency that a user (e.g., a user associated with the navigation computing device) has previously been at the location (e.g., within a threshold distance of the location). For example, the context data can include a record of the frequency with which a user has travelled past each of the one or more landmarks. The navigation computing system can determine when the frequency of a user travelling past a landmark satisfies one or more familiarity criteria (e.g., a threshold minimum frequency), and select a landmark that satisfies the one or more familiarity criteria. By way of further example, the level of familiarity can be associated with a portion of the one or more features (e.g., a number of one or more visual characteristics) each of the one or more landmarks has in common with another landmark the user has previously viewed.

In some embodiments, adjusting the at least one navigational instruction based at least in part on the level of familiarity can be used in generating the at least one navigational instruction that references the at least one landmark. For example, the navigation computing system can access information associated with the at least one land mark (e.g., the name of a landmark used by an areas local residents) and use the information to modify the navigational instruction that is used. By way of further example, the navigation computing system can determine that when the level of familiarity exceeds a threshold level of familiarity, that the navigational instruction will be selected from a data including locally used terms for a landmark.

In some embodiments, the context data can include information associated with a time of day, a season, a language (e.g., French, Russian, and/or Chinese), the one or more features visible from the location, and/or a mode of transportation (e.g., personal automobile, bus, bicycle, and/or foot travel).

In some embodiments, the navigation computing system can receive image data including a plurality of images associated with one or more semantic tags, wherein each of the one or more semantic tags is associated with one or more features of the plurality of images. Further, each of the one or more features can be associated with a geographic location. For example, the navigation computing system can receive image data (e.g., tagged digital photographs) including information associated with the plurality of semantic tags and the plurality of images via a communication network through which one or more signals (e.g., electronic signals) and/or data can be sent and/or received.

In some embodiments, the navigation computing system can determine one or more landmarks including the one or more features that satisfy one or more entropic criteria associated with a localized prominence of each of the one or more features. For example, the navigation computing system can access the plurality of semantic tags to determine the one or more landmarks in an area that include the one or more features (e.g., size, distance from a vantage point) that satisfy one or more entropic criteria (e.g., size greater than a threshold size or distance within a threshold distance).

In some embodiments, the navigation computing system can determine, based at least in part on context data associated with a location of a vantage point on a path including a plurality of locations, the one or more landmarks associated with the vantage point. For example, the navigation computing system can access context data including the time of day, season, and/or the location of objects between the vantage point and the one or more landmarks. Based on the context, the navigation computing system can determine the one or more landmarks that are visible (based on the time of day and season) and that are not obstructed by other objects between the vantage point and each of the one or more landmarks.

In some embodiments, the navigation computing system can generate navigational data including one or more indications associated with the one or more landmarks. For example, the navigation computing system can generate visual instructions on a display device, including a description of the appearance of a landmark (e.g., "a tall glass high-rise") and the location of the landmark (e.g., "one hundred meters ahead and on the left").

In some embodiments, each of the one or more features can be associated with a time of day (e.g., an hour and minute of the day), a season (e.g., winter, summer, spring, or autumn), a visual constancy (e.g., the extent to which the one or more features appear the same over time), and/or one or more locations from which each of the one or more features is visible (e.g., geographic locations including a latitude, longitude, and/or altitude from which each feature is visible).

In some embodiments, the one or more entropic criteria can include a frequency of occurrence of each of the one or more features within a predetermined area not exceeding a predetermined threshold frequency (e.g., how often a feature occurs within the predetermined area), a temporal persistence (e.g., how long a feature has been present) of each of the one or more features at a location exceeding a predetermined threshold duration, and/or a size (e.g., physical dimensions) of each of the one or more features exceeding a threshold size.

In some embodiments, the one or more indications can include one or more visual indications (e.g., text displayed on a display device) associated with a relative location of the one or more landmarks on the path with respect to the vantage point, and/or one or more audible indications (e.g., audio generated produced by a loudspeaker) associated with the relative location of the one or more landmarks on the path with respect to the vantage point.

In some embodiments, determining a mode of travel associated with the vantage point can be used in determining one or more landmarks including the one or more features that satisfy one or more entropic criteria associated with a localized prominence of each of the one or more features. For example, the navigation computing system can access data associated with the vantage point (e.g., the middle of a highway, sidewalk, or lake) that can be used to determine an associated mode of transportation (e.g., an automobile, foot travel, or a boat).

Further, the navigation computing system can determine, based at least in part on a direction of travel and velocity along the path, the one or more landmarks that will be visible from the vantage point within a predetermined time period associated with the mode of travel. For example, the navigation computing system can determine a velocity associated with the mode of transportation and determine the landmarks that will be visible within the next ten seconds.

In some embodiments, the navigation computing system can generate a navigational instruction query associated with a utility of the at least one navigational instruction. The navigational instruction query can include one or more visual indications and/or one or more audible indications. For example, when the navigation computing system has determined that a predetermined amount of time has elapsed since generating the at least one navigational instruction, the navigation computing system can generate the navigational instruction query via an output device (e.g., a display device and/or an audio output device).

In some embodiments, the navigation computing system can receive one or more responses to the navigational instruction query. The one or more responses to the navigational instruction query can include one or more signals or data received from one or more input devices that can receive the one or more responses from a user of the navigation computing system (e.g., a keyboard, touch screen display, and/or microphone).

In some embodiments, the navigation computing system can adjust the one or more entropic criteria based at least in part on the one or more responses to the navigational instruction query. When the one or more responses indicate that the at least one navigational instruction was useful, the one or more entropic criteria can be adjusted by modifying the one or more entropic criteria. For example, when the one or more entropic criteria include a minimum rate of occurrence of a feature (e.g., a certain type of restaurant occurs once per two and a half square kilometers), and the one or more responses indicate that the landmark was confused with another landmark with the same feature, the minimum rate of occurrence of the feature can be decreased (e.g., the certain type of restaurant occurs once every three square kilometers).

The systems, methods, devices, apparatuses, and tangible non-transitory computer-readable media in the disclosed technology can provide a variety of technical effects and benefits including an improvement in landmark determination for use in navigation and geocoding. In particular, the disclosed technology may assist the user (e.g. a driver of a vehicle) in performing a technical task (e.g. driving a vehicle to a specified location) by means of a continued and/or guided human-machine interaction process. It may also provide benefits including improvements in the performance of communications networks, better resource usage efficiency, and improved safety.

The disclosed technology can improve the performance of communications network operation by more effectively determining a set of landmarks to facilitate navigation. The set of landmarks can then be provided to more efficiently route traffic through a transportation network and avoid situations in which communications network bandwidth is wasted due to ineffective navigational directions (e.g., sending additional sets of instructions across the network when the first set of instructions is not properly followed). As such, more effective provision of navigational instructions can result in a reduction in the number of navigational instructions sent through a communications network with a corresponding reduction in bandwidth utilization.

Furthermore, the disclosed technology can improve the efficiency of resource consumption (e.g., fuel and electrical energy) by providing more effective navigational instructions that leverage the use of locally prominent landmarks. For example, navigational instructions that include landmarks can result in fewer missed turns and/or backtracking, thereby reducing the associated excess usage of fuel or electrical energy that results.

Additionally, the use of landmarks for navigational purposes can improve driver safety when travelling in a vehicle. For example, navigational instructions that include more readily observed, locally prominent landmarks, can reduce driver distraction resulting from navigational instructions that do not use prominent landmarks (e.g., street names which may be located on awkwardly located or poorly illuminated street signs).

Accordingly, the disclosed technology may assist the driver of a vehicle to perform more efficiently/effectively the technical task of driving the vehicle to a specified location by means of a continued and/or guided human-machine interaction process. In addition, the disclosed technology may provide a computing system that facilitates more effective landmark identification for use in navigation and geocoding. The disclosed technology provides the specific benefits of reduced network bandwidth utilization, more efficient fuel and energy usage, and greater safety, any of which can be used to improve the effectiveness of a wide variety of services including navigation services and geocoding services.

With reference now to FIGS. 1-14, example embodiments of the present disclosure will be discussed in further detail. FIG. 1 depicts a diagram of an example system according to example embodiments of the present disclosure. The system 100 includes a computing device 102, a server computing system 130, a training computing system 150, and one or more remote computing systems 170 that are communicatively connected and/or coupled over a network 180.

The computing device 102 can include any type of computing device, including, for example, a personal computing device (e.g., laptop computing device or desktop computing device), a mobile computing device (e.g., smartphone or tablet), a gaming console, a controller, a wearable computing device (e.g., a smart watch), an embedded computing device, and/or any other type of computing device.

The computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, including RAM, ROM, EEPROM, EPROM, flash memory devices, magnetic disks, etc., and combinations thereof. The memory 114 can store data 116 and instructions 118 which are executed by the processor 112 to cause the computing device 102 to perform operations.

In some embodiments, the computing device 102 can perform one or more operations including accessing image data including a plurality of images associated with one or more semantic tags. Each of the one or more semantic tags accessed by the computing device 102 can be associated with one or more features of the plurality of images. Further, each of the one or more features can be associated with a geographic location. The operations performed by the computing device 102 can include determining one or more landmarks including the one or more features that satisfy one or more entropic criteria associated with a localized prominence of each of the one or more features. The operations performed by the computing device 102 can also include determining, based at least in part on context data associated with a location of a vantage point on a path including a plurality of locations, the one or more landmarks associated with the vantage point. Furthermore, the operations performed by the computing device 102 can include generating navigational data including one or more indications associated with the one or more landmarks.

In some implementations, the computing device 102 can store or include one or more machine-learned models 120. For example, the one or more machine-learned models 120 can include various machine-learned models including neural networks (e.g., deep neural networks) or other types of machine-learned models, including non-linear models and/or or linear models. Neural networks can include feed-forward neural networks, recurrent neural networks (e.g., long short-term memory recurrent neural networks), convolutional neural networks or other forms of neural networks. Examples of the one or more machine-learned models 120 are discussed with reference to FIGS. 1-14.

In some implementations, the one or more machine-learned models 120 can be received from the server computing system 130 over network 180, stored in the computing device memory 114, and then used or otherwise implemented by the one or more processors 112. In some implementations, the computing device 102 can implement multiple parallel instances of a single machine-learned model of the one or more machine learned models 120 (e.g., to perform parallel landmark determination across multiple instances of the machine-learned model 120). More particularly, the one or more machine-learned models 120 can determine and/or identify the landmarks and/or the location of landmarks based on various inputs including semantic tags (e.g., semantic tags associated with one or more features of a landmark). Further, the one or more machine learned models 120 can determine one or more navigational instructions to provide in association with landmarks that are identified.

Additionally or alternatively, one or more machine-learned models 140 can be included in or otherwise stored and implemented by the server computing system 130 that communicates with the computing device 102 according to a client-server relationship. For example, the machine-learned models 140 can be implemented by the server computing system 140 as a portion of a web service (e.g., a landmark determination service). Thus, one or more machine-learned models 120 can be stored and implemented at the computing device 102 and/or one or more machine-learned models 140 can be stored and implemented at the server computing system 130.

The computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can include any suitable processing device (e.g., a processor core, a microprocessor, an ASIC, a FPGA, a controller, a microcontroller, etc.) and can include one processor or a plurality of processors that are operatively connected. The memory 134 can include one or more non-transitory computer-readable storage mediums, including RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some embodiments, the server computing system 130 can perform one or more operations including accessing image data including a plurality of images associated with one or more semantic tags. Each of the one or more semantic tags can be associated with one or more features of the plurality of images. Further, each of the one or more features can be associated with a geographic location. The operations performed by the server computing system 130 can include determining one or more landmarks including the one or more features that satisfy one or more entropic criteria associated with a localized prominence of each of the one or more features. The operations performed by the server computing system 130 can also include determining, based at least in part on context data associated with a location of a vantage point on a path including a plurality of locations, the one or more landmarks associated with the vantage point. Furthermore, the operations performed by the server computing system 130 can include generating navigational data including one or more indications associated with the one or more landmarks. Furthermore, the server computing system 130 can perform image content analysis on one or more inputs (e.g., one or more images) that are provided to the server computing system 130. For example, the server computing system 130 can receive data, via the network 180, including one or more images and/or associated semantic tags. The server computing system 130 can then perform various operations, which can include the use of the one or more machine-learned models 140, to detect one or more features of the one or more images and/or to associated semantic tags with images. By way of further example, the server computing system 130 can use object recognition techniques to detect one or more objects in an image (e.g., detecting pedestrians, vehicles, various buildings, fountains, street signs, and road markings) and generate semantic information based on recognition of the objects. In another example, the server computing system 130 can receive data from one or more remote computing systems (e.g., the one or more remote computing systems 170) which can include images that have been associated with semantic tags (e.g., images with manual user associated semantic tags and/or images with semantic tags generated by a user device). The data received by the server computing system 130 can then be stored (e.g., stored in an image repository) for later use by the computing system 130.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

Furthermore, the server computing system 130 can receive various data from As described above, the server computing system 130 can store or otherwise include one or more machine-learned models 140. For example, the one or more machine-learned models 140 can include various machine-learned models. Example machine-learned models include neural networks or other multi-layer non-linear models. Example neural networks include feed forward neural networks, deep neural networks, recurrent neural networks, and convolutional neural networks. Examples of the one or more machine-learned models 140 are discussed with reference to FIGS. 1-14.

The computing device 102 and/or the server computing system 130 can train the one or more machine-learned models 120 and/or 140 via interaction with the training computing system 150 that is communicatively connected and/or coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, including RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned one or more machine-learned models 120 and/or the one or more machine-learned models 140 respectively stored at the computing device 102 and/or the server computing system 130 using various training or learning techniques, including, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the one or more machine-learned models 120 and/or the one or more machine-learned models 140 based on a set of training data 162. The training data 162 can include, for example, semantic data (e.g., semantic tags) describing the location and/or one or more features of landmarks in an area. For example, the training data can include physical dimensions associated with a landmark, the proximity of a landmark to one or more points of reference (e.g., a vantage point), the location of a landmark (e.g., latitude, longitude, and/or altitude of a landmark), and/or various metadata associated with the landmark (e.g., a nickname for a landmark and/or a former name of a landmark).

In some implementations, if the user has provided consent, the training examples can be provided by the computing device 102. Thus, in such implementations, the one or more machine-learned models 120 provided to the computing device 102 can be trained by the training computing system 150 on user-specific data received from the computing device 102. In some instances, this process can be referred to as personalizing the model.

The model trainer 160 can include computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium including RAM hard disk or optical or magnetic media.

In some embodiments, the training computing system 150 can perform one or more operations including accessing image data including a plurality of images associated with one or more semantic tags. Each of the one or more semantic tags can be associated with one or more features of the plurality of images. Further, each of the one or more features can be associated with a geographic location. The operations performed by the training computing system 150 can include determining one or more landmarks including the one or more features that satisfy one or more entropic criteria associated with a localized prominence of each of the one or more features. The operations performed by the training computing system 150 can also include determining, based at least in part on context data associated with a location of a vantage point on a path including a plurality of locations, the one or more landmarks associated with the vantage point. Furthermore, the operations performed by the training computing system 150 can include generating navigational data including one or more indications associated with the one or more landmarks.

Each of the one or more remote computing systems 170 includes one or more processors 172 and a memory 174. The one or more processors 172 can include any suitable processing device (e.g., a processor core, a microprocessor, an ASIC, a FPGA, a controller, a microcontroller, etc.) and can include one processor or a plurality of processors that are operatively connected. The memory 174 can include one or more non-transitory computer-readable storage mediums, including RAM, ROM, EEPROM, EPROM, flash memory devices, magnetic disks, etc., and combinations thereof. The memory 174 can store data 176 and instructions 178 which are executed by the processor 172 to cause the server computing system 170 to perform operations.

In some implementations, the one or more remote computing systems 170 includes or is otherwise implemented by one or more computing devices. In instances in which the one or more remote computing systems 170 includes plural computing devices, such computing devices can operate according to sequential computing architectures, parallel computing architectures, and/or some combination thereof. Furthermore, the one or more remote computing systems 170 can be used to collect, generate, send, and or receive one or more signals and/or data including one or more semantic tags that can be associated with one or more locations and/or one or more features of the one or more locations. The one or more remote computing systems 170 can include a smart phone device that a user of the smart phone device can use to generate a semantic tag associated with one or more images captured by a camera of the smart phone device. For example, the user of the smart phone device can capture an image of a local landmark (e.g., a fountain) that includes a latitude and longitude of the local landmark as geolocation information embedded in the image. The user can then manually annotate the image with a semantic tag that includes a description of the local landmark which is then sent to the server computing system 170 which includes an image repository. The manually annotated image can be strongly encrypted, anonymized (e.g., any personal information associated with the image is either not collected or is deleted after being received), and maintained in a privacy enhancing way for use by the server computing system 170 which can provide the image and the associated semantic tag for use an image content analysis portion of the server computing system 170 and/or the training computing system 150.

The network 180 can include any type of communications network, including a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1 illustrates one example computing system that can be used to implement the present disclosure. Other computing systems can be used as well. For example, in some implementations, the computing device 102 can include the model trainer 160 and the training dataset 162. In such implementations, the one or more machine-learned models 120 can be both trained and used locally at the computing device 102. In some of such implementations, the computing device 102 can implement the model trainer 160 to personalize the one or more machine-learned models 120 based on user-specific data.

FIG. 2 depicts a diagram of an example device according to example embodiments of the present disclosure. A computing device 200 can include one or more features of the computing device 102, the server computing system 130, and/or the training computing system 150. Furthermore, the computing device 200 can perform one or more actions and/or operations including the one or more actions and/or operations performed by the computing device 102, the server computing system 130, and/or the training computing system 150, which are depicted in FIG. 1.

As shown in FIG. 2, the computing device 200 can include one or more memory devices 202, landmark data 204, one or more interconnects 232, one or more processors 220, a network interface, one or more mass storage devices 224, one or more output devices 226, a sensor array 228, and one or more input devices 230.

The one or more memory devices 202 can store information and/or data (e.g., the landmark data 204) including information associated with the processing of one or more instructions that are used to perform one or more actions and/or operations including accessing semantic tags, identifying landmarks, selecting a landmark for use in navigation, and/or generating a navigational instruction that references a landmark.

The landmark data 204 can include one or more portions of the data 116, the data 136, and/or the data 156 which are depicted in FIG. 1. Furthermore, the landmark data 204 can include information associated with one or more maps, one or more semantic tags, sensor outputs, and/or machine-learned models.

The one or more interconnects 210 can include one or more interconnects or buses that can be used to send and/or receive one or more signals (e.g., electronic signals) and/or data (e.g., the landmark data) between components of the computing device 200, including the one or more memory devices 202, the one or more processors 220, the network interface 222, the one or more mass storage devices 224, the one or more output devices 226, the sensor array 228, and/or the one or more input devices 230. The one or more interconnects 210 can be arranged or configured in different ways including as parallel or serial connections. Further the one or more interconnects 210 can include one or more internal buses to connect the internal components of the computing device 200; and one or more external buses used to connect the internal components of the computing device 200 to one or more external devices. By way of example, the one or more interconnects 210 can include different interfaces including Industry Standard Architecture (ISA), Extended ISA, Peripheral Components Interconnect (PCI), PCI Express, Serial AT Attachment (SATA), HyperTransport (HT), USB (Universal Serial Bus), Thunderbolt, and/or IEEE 1394 interface (FireWire).

The one or more processors 220 can include one or more computer processors that are configured to execute the one or more instructions stored in the one or more memory devices 202. For example, the one or more processors 220 can, for example, include one or more general purpose central processing units (CPUs), application specific integrated circuits (ASICs), and/or one or more graphics processing units (GPUs). Further, the one or more processors 220 can perform one or more actions and/or operations including one or more actions and/or operations associated with the landmark data 204. For example, the one or more processors 220 can include single or multiple core devices including a microprocessor, microcontroller, integrated circuit, and/or logic device.

The network interface 222 can support network communications. For example, the network interface 222 can support communication via networks including a local area network and/or a wide area network (e.g., the Internet). The one or more mass storage devices 224 (e.g., a hard disk drive and/or a solid state drive) can be used to store data including the landmark data 204. The one or more output devices 226 can include one or more display devices (e.g., LCD display, OLED display, and/or CRT display), one or more light sources (e.g., LEDs), one or more loud speakers, and/or one or more haptic output devices.

The one or more input devices 230 can include one or more keyboards, one or more touch sensitive devices (e.g., a touch screen display), one or more buttons (e.g., ON/OFF buttons, YES/NO buttons), one or more microphones, and/or one or more cameras (e.g., cameras that can be used for the detection of gestures and/or facial expressions).

The one or more memory devices 202 and the one or more mass storage devices 224 are illustrated separately, however, the one or more memory devices 202 and the one or more mass storage devices 224 can be regions within the same memory module. The computing device 200 can include one or more additional processors, memory devices, network interfaces, which may be provided separately or on a same chip or board. The one or more memory devices 202 and the one or more mass storage devices 224 can include one or more computer-readable media, including, but not limited to, non-transitory computer-readable media, RAM, ROM, hard drives, flash drives, and/or other memory devices.

The one or more memory devices 202 can store sets of instructions for applications including an operating system that can be associated with various software applications or data. The one or more memory devices 202 can be used to operate various applications including a mobile operating system developed specifically for mobile devices. As such, the one or more memory devices 202 can store instructions that allow the software applications to access data including wireless network parameters (e.g., identity of the wireless network, quality of service), and invoke various services including telephony, location determination (e.g., via global positioning service (GPS) or WLAN), and/or wireless network data call origination services. In other embodiments, the one or more memory devices 202 can be used to operate or execute a general-purpose operating system that operates on both mobile and stationary devices, such as smartphones and desktop computers, for example.

The software applications that can be operated or executed by the computing device 200 can include applications associate with the system 100 shown in FIG. 1. Further, the software applications that can be operated or executed by the computing device 200 can include native applications or web-based applications.

In some embodiments, the computing device 200 can be associated with or include a positioning system (not shown). The positioning system can include one or more devices or circuitry for determining the position of the computing device 200. For example, the positioning device can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or Wi-Fi hotspots, beacons, and the like and/or other suitable techniques for determining position.

Figure 3:
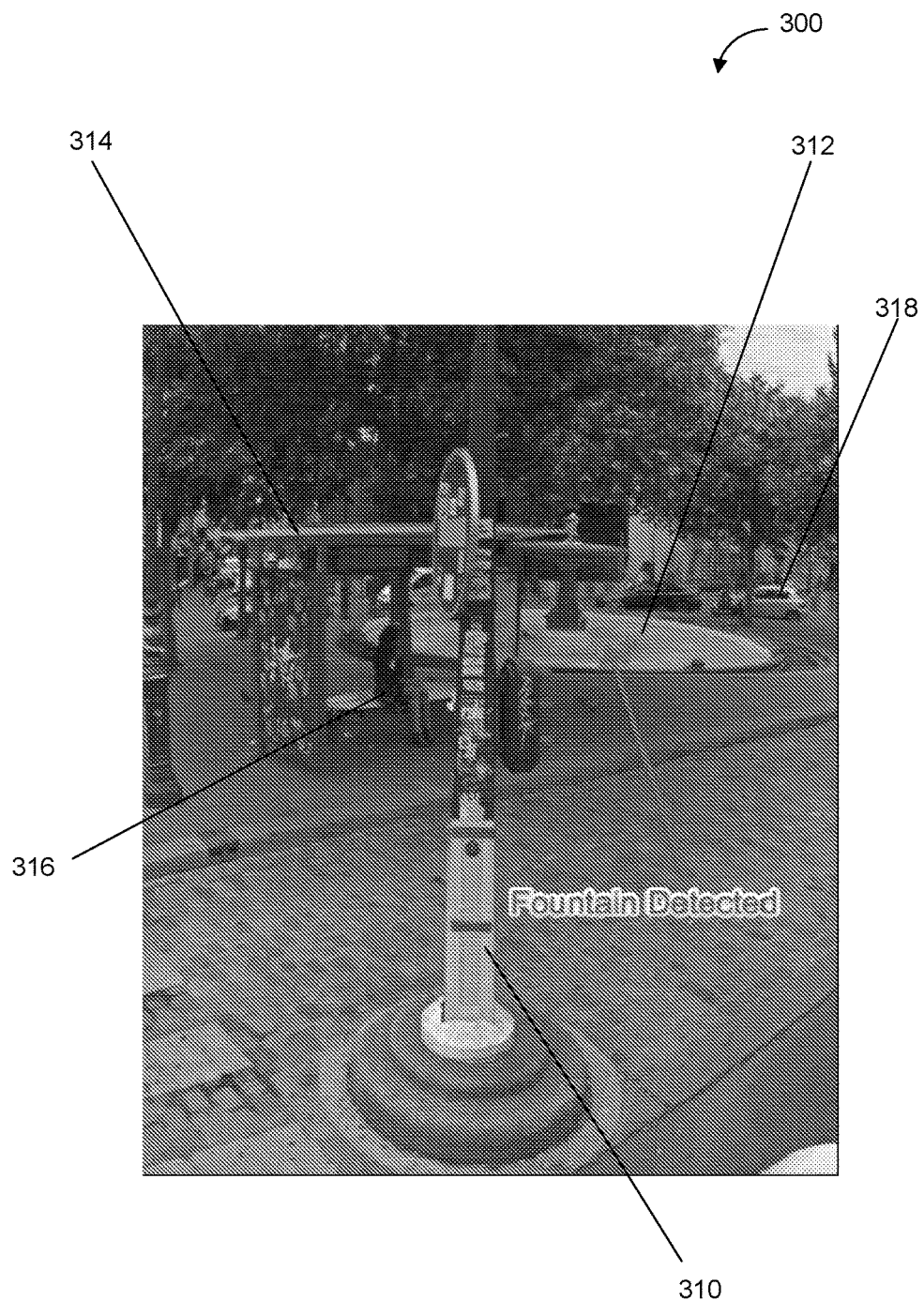
FIG. 3 depicts an example of landmark detection according to example embodiments of the present disclosure.

FIG. 3 depicts an example of landmark detection according to example embodiments of the present disclosure. The output illustrated in FIG. 3 can be generated and/or determined by a computing system or computing device that includes one or more features of the computing device 102, the server computing system 130, and/or the training computing system 150, which are depicted in FIG. 1. As shown in FIG. 3, the image 300 includes a pole object 310, a fountain object 312, a bus stop object 314, a pedestrian object 316, and a vehicle object 318.

Figure 7:
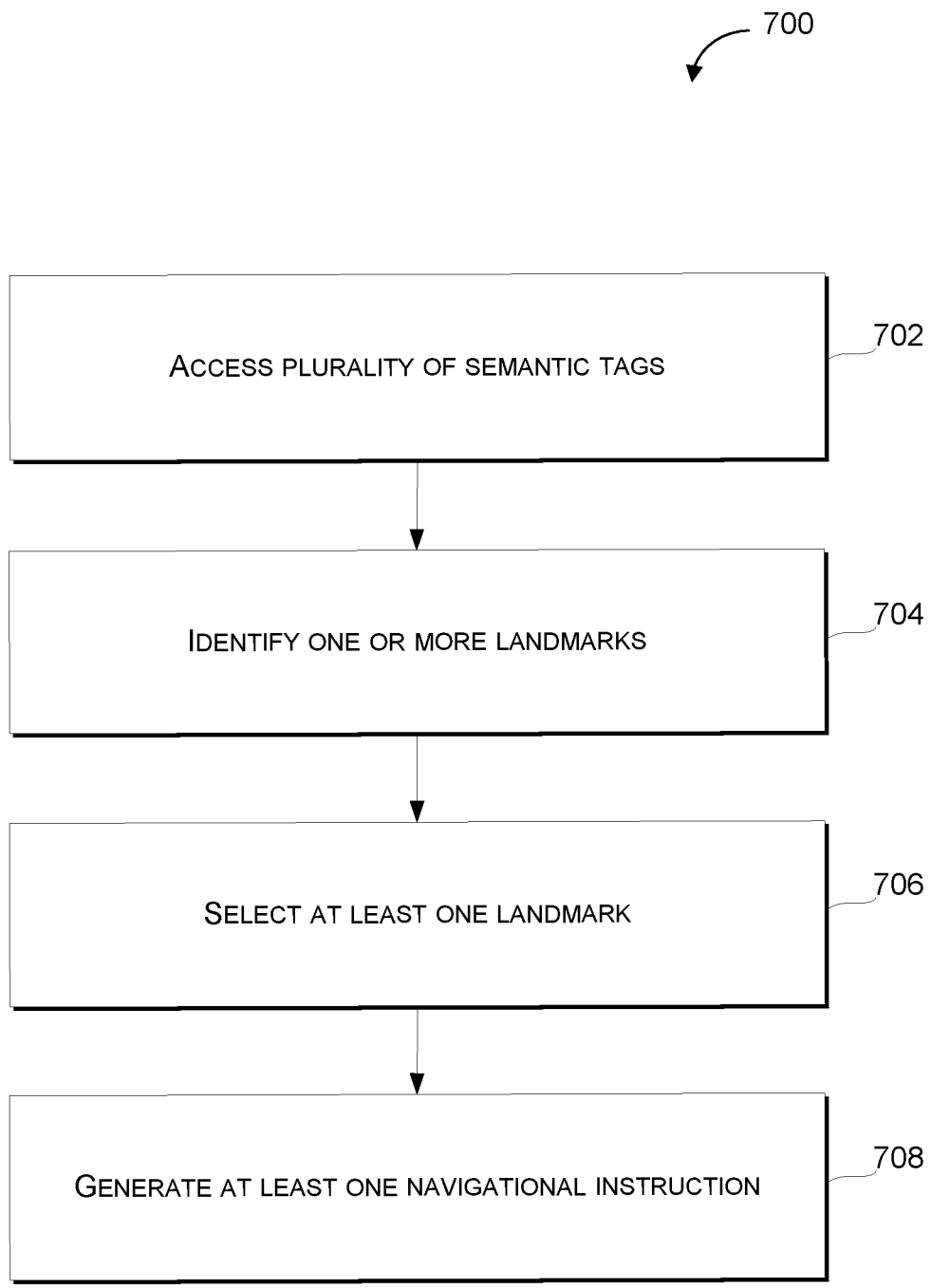
FIG. 7 depicts a flow diagram of providing navigational instructions that reference landmarks according to example embodiments of the present disclosure.

The image 300 depicts a scene with one or more features including one or more features associated with various objects that have been identified by a content analysis system (e.g., a content analysis system including one or more machine learned models trained to detect one or more features of input content which can include or more images). For example, the content analysis system can include one or more features of the computing device 102, the server computing system 130, and/or the training computing system 150. Further, the one or more features of the image 300, including the pole object 310, the fountain object 312, the bus stop object 314, the pedestrian object 316, and the vehicle object 318, can be associated with various semantic tags (e.g., semantic tags that include one or more features of the plurality of semantic tags described in the method 700 that is depicted in FIG. 7) that can include descriptions of various aspects of the one or more features. For example, the one or more features of the image 300 can be associated with one or more of a plurality of semantic tags based on image content analysis performed by one or more machine-learned models that include one or more features of the one or more machine-learned models 120 that are depicted in FIG. 1.

In this example, a semantic tag associated with the pole object 310 can be used to indicate that the pole object 310 is associated with a type of object that occurs frequently (e.g., there are many poles throughout the city in which the image 300 was captured including poles for street signs, telephone cables, electrical cables, and/or various utility poles) and that the pole object 310 has low distinctiveness (e.g., the various poles found throughout the city in which the image 300 was captured can have a similar size, shape, and appearance). Further, with respect to prominence, the pole object 310 is a significant size (e.g., significant relative to a predetermined significance threshold which can be associated with one or more physical dimensions including the height of an object) and can be seen from various angles and distances.

Additionally, the pole object 310 is visually constant with minimal changes in appearance over time. Changes in the appearance of the pole object 310 can include minor changes due to climactic conditions (e.g., snow cover) and human interventions (e.g., graffiti and/or posters) that do not significantly render the pole object 310 indistinct. Furthermore, the pole object 310 is attached to the ground and has a location that is constant over time which makes the pole object 310 more apt to be selected as a landmark in comparison to objects that are likely to move away from a location (e.g., a pedestrian).

Furthermore, with respect to context associated with the pole object 310 (e.g., context associated with information that can be included in the context data described in the method 700 that is depicted in FIG. 7), the pole object 310 is in the foreground and closer to the vantage point from which the image was captured which allows for an unobstructed view of the pole object 310. The image of the pole object 310 is captured during a time at which day light allows the pole object 310 to be clearly visible without additional light (e.g., a street lamp). The pole object 310 is also located in proximity to a street lamp (not shown) that can illuminate the pole object 310 when darkness falls. As such, when one or more landmarks are selected (e.g., selected by the computing device 102) at the vantage point at which the image 300 was captured, the pole object 310 is less apt to be included than the other potential landmarks in the image 300 that occur less frequently, are more distinctive, more prominent, and/or are more visible from the vantage point.

A semantic tag associated with the fountain object 312 can be used to indicate that the fountain object 312 is associated with a type of object that occurs infrequently (e.g., there are a small number of fountains throughout the city in which the image 300 was captured) and that the fountain object 312 is highly distinctive (e.g., the fountain object 312 has a unique sculpture that sets it apart from other fountains). Further, with respect to prominence, the fountain object 312 is a large size and the water spraying into the air from the fountain object 312 increases the distance from which the fountain object 312 is visible. The fountain object 312 can also be seen from different angles (e.g., the fountain object 312 can be seen from all sides other than from beneath the fountain object 312) and distances.

However, the fountain object 312 has a lower visually constancy since the appearance of the fountain changes substantially depending on the season (e.g., the water in the fountain is frozen or drained in cold seasons) and whether the fountain is operational (e.g., the fountain object 312 looks different when it is spouting water than when the fountain is not spouting water). Furthermore, the fountain object 312 is firmly fixed in the ground and has a location that is constant over time which makes the fountain object 312 more apt to be selected as a landmark in comparison to objects that are mobile (e.g., a bus or a train).

Furthermore, with respect to context associated with the fountain object 312 (e.g., context associated with information that can be included in the context data described in the method 700 that is depicted in FIG. 7), the fountain object 312 is in the background and further away from the vantage point from which the image was captured which can sometimes obstruct the view of the fountain object 312 depending on the vantage point from which the fountain object 312 is viewed. The image of the fountain object 312 is captured during a time at which day light allows the fountain object 312 to be clearly visible without additional light (e.g., a street lamp). The fountain object 312 also includes its own set of lamps that can illuminate the fountain object 312 at night. As such, when one or more landmarks are selected (e.g., selected by the computing device 102) at the vantage point at which the image 300 was captured, the fountain object 312 is more apt to be included than the other potential landmarks in the image 300 that occur more frequently, are less prominent, and/or are less distinctive.

A semantic tag associated with the bus stop object 314 can be used to indicate that the bus stop object 314 is associated with a type of object that occurs frequently (e.g., there are many bus stops throughout the city in which the image 300 was captured) and that the bus stop object 314 has low distinctiveness (e.g., the bus stop object 314 lacks distinctive features that set it apart from other bus stops). Further, with respect to prominence, the bus stop object 314 is a significant size and can be seen from various angles and distances. Additionally, the bus stop object 314 is visually constant with minimal changes in appearance over time. For example, changes in the appearance of the bus stop object 314 can include minor changes due to climactic conditions (e.g., snow cover) and human interventions (e.g., graffiti and/or posters) that do not significantly render the bus stop object 314 indistinct. Further, the bus stop object 314 is a structure that is attached to the ground and has a location that is constant over time which makes the bus stop object 314 more apt to be selected as a landmark.

Furthermore, with respect to context associated with the bus stop object 314 (e.g., context associated with information that can be included in the context data described in the method 700 that is depicted in FIG. 7), the bus stop object 314 is in the background and further away from the vantage point from which the image was captured which obstructs the view of the bus stop object 314. For example, from various vantage points, the pole object 310 can obstruct the bus object 314. The image of the bus stop object 314 is captured during a time at which day light allows the bus stop object 314 to be clearly visible without additional light (e.g., a street lamp). Further, the bus stop object 314 is also located in proximity to a street lamp (not shown) and has its own light source that illuminates when night falls (e.g., a lamp inside the bus stop object 314). As such, when one or more landmarks are selected (e.g., selected by the computing device 102) at the vantage point at which the image 300 was captured, the bus stop object 314 is less apt to be included than the other potential landmarks in the image 300 that occur less frequently, are more distinctive, and/or are more visible from the vantage point.

A semantic tag associated with the pedestrian object 316 can be used to indicate that the pedestrian object 316 is associated with a type of object that occurs frequently (e.g., there are many pedestrians present at various locations throughout the city in which the image 300 was captured) and that the pedestrian object 316 has low distinctiveness (e.g., at a distance pedestrians tend to look alike and in close proximity a large portion of pedestrians are not very distinctive in appearance). Further, with respect to prominence, the pedestrian object 316 is not especially large and is often obstructed by other objects including, for example, the pole object 310 and the bus stop object 314, depending on the vantage point from which the pedestrian object 316 is viewed. Additionally, the pedestrian object 316 is not visually constant since changes in clothing and other aspects of a pedestrian's physical appearance are relatively frequent. For example, changes in the appearance of the pedestrian object 316 can include changes in the clothing, eye-wear, and hats, worn by the pedestrian object 316. Further, the pedestrian object 316 is mobile and has a location that is highly variable over time. For example, the pedestrian object 316 can move from a home location to the location of the bus stop object 314, to a bus that transports the pedestrian object 316 away from the location in the image 300.

Furthermore, with respect to context associated with the pedestrian object 316 (e.g., context associated with information that can be included in the context data described in the method 700 that is depicted in FIG. 7), the pedestrian object 316 is in the background and at intermediate range from the vantage point from which the image was captured. The image of the pedestrian object 316 is captured during a time at which day light allows the pedestrian object 316 to be clearly visible without additional light (e.g., a street lamp). The pedestrian object 316 is also located in proximity to a street lamp (not shown) that can illuminate the pedestrian object 316 when darkness falls. As such, when one or more landmarks are selected (e.g., selected by the computing device 102) at the vantage point at which the image 300 was captured, the pedestrian object 316 is less apt to be included than the other potential landmarks in the image 300 that occur less frequently, are more distinctive, are more prominent, and/or are more visible from the vantage point. Further, the high mobility associated with the pedestrian object 316 also makes the pedestrian object 316 less apt to be selected as a landmark.

A semantic tag associated with the vehicle object 318 can be used to indicate that the vehicle object 318 is associated with a type of object that occurs frequently (e.g., there are numerous vehicles present at various locations throughout the city in which the image 300 was captured) and that the vehicle object 318 has low distinctiveness (e.g., there are many vehicles that appear similar including vehicles of the same make, model, and color). Further, with respect to prominence, the vehicle object 318 is a significant size and can be seen from various angles and distances, however, due to being a mobile, the vehicle object 318 is often obstructed by other objects. Additionally, the vehicle object 318 is visually constant since the shape and color of the vehicle object 318 remain constant over time. Further, the vehicle object 318 is highly mobile and has a location that can change rapidly in a short period of time. For example, except when parked, the vehicle object 318 tends to change location frequently as it is used to transport people and goods throughout the city in which the image 300 was captured.

Furthermore, with respect to context associated with the vehicle object 318 (e.g., context associated with information that can be included in the context data described in the method 700 that is depicted in FIG. 7), the vehicle object 318 is far in the background with respect to the vantage point from which the image 300 was captured. The image of the vehicle object 318 is captured during a time at which day light allows the vehicle object 318 to be clearly visible without additional light (e.g., a street lamp). The vehicle object 318 also has its own light source (e.g., headlights) that can illuminate the area around the vehicle object 318, but that does not provide a substantial amount of illumination of the vehicle object 318 itself (e.g., the headlights and tail lights of the vehicle object 318 are highly visible but provide different impression of the appearance of the vehicle object 318 when darkness has fallen). As such, when one or more landmarks are selected (e.g., selected by the computing device 102) at the vantage point at which the image 300 was captured, the vehicle object 318 is less apt to be included than the other potential landmarks in the image 300 that occur less frequently, are more distinctive, are more prominent, and/or are more visible from the vantage point. Further, the high mobility associated with the vehicle object 318 also makes the vehicle object 318 less apt to be selected as a landmark. By way of example, the computing device 102 depicted in FIG. 1 can select at least one of the objects 310/312/314/316/318 as a landmark for use as a navigational instruction (e.g., the navigational instruction described in the method 700 depicted in FIG. 7).

Figure 4:
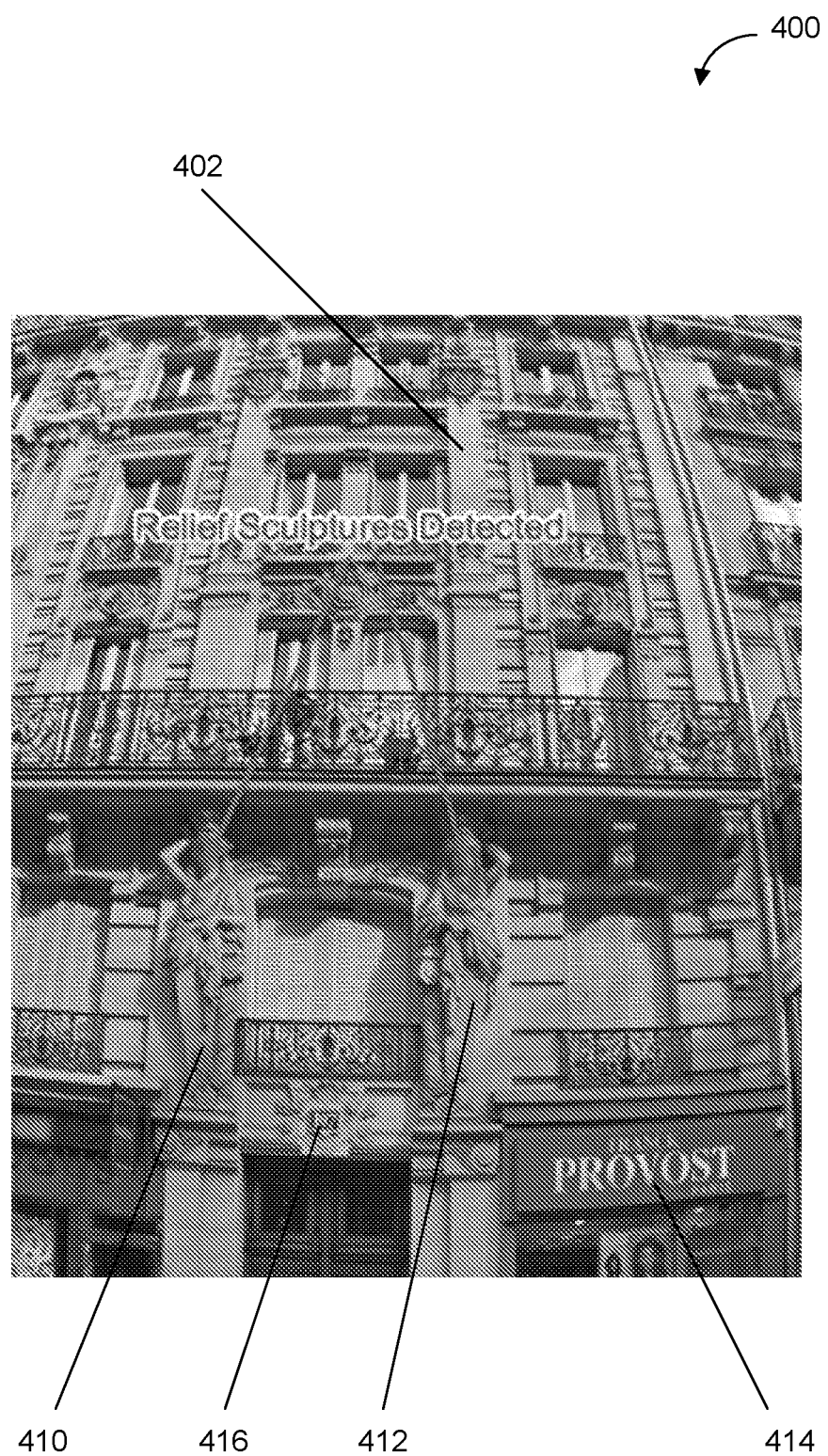
FIG. 4 depicts an example of landmark detection according to example embodiments of the present disclosure.

FIG. 4 depicts an example of landmark detection according to example embodiments of the present disclosure. The output illustrated in FIG. 4 can be generated and/or determined by a computing device or computing system that includes one or more features of the computing device 102, the server computing system 130, and/or the training computing system 150, which are depicted in FIG. 1. As shown in FIG. 4, the image 400 includes a building object 402, a sculpture object 410, a sculpture object 412, a signage object 414, and an address object 416.

The image 400 depicts a scene with one or more features including one or more features associated with various objects that have been identified by a content analysis system (e.g., a content analysis system including one or more machine learned models trained to detect one or more features of input content which can include or more images). For example, the content analysis system can include one or more features of the computing device 102, the server computing system 130, and/or the training computing system 150. Further, the one or more features of the image 400, including the building object 402, the sculpture object 410, the sculpture object 412, the signage object 414, and the address object 416, can be associated with various semantic tags (e.g., semantic tags that include one or more features of the plurality of semantic tags described in the method 700 that is depicted in FIG. 7) that can include descriptions of various aspects of the one or more features. For example, the one or more features of the image 400 can be associated with one or more of a plurality of semantic tags based on image content analysis performed by one or more machine-learned models that include one or more features of the one or more machine-learned models 120 that are depicted in FIG. 1.

A semantic tag associated with the sculpture object 410 and the sculpture object 412 can be used to indicate that the sculpture object 410 and the sculpture object 412 are associated with a type of object that occurs infrequently (e.g., there are a small number of matching pairs of relief sculptures on buildings in the city in which the image 400 was captured) and that the sculpture object 410 and the sculpture object 412 are highly distinctive (e.g., the sculpture object 410 and the sculpture object 412 have unique sculptural features that set them apart from other sculptures). Further, with respect to prominence, the sculpture object 410 and the sculpture object 412 are a significant size (e.g., significant relative to a predetermined significance threshold which can be associated with one or more physical dimensions including the height of an object) and protrude from the surface of the building object 402, which allows the sculpture object 410 and the sculpture object 412 to be seen from various angles and distances.

Additionally, the location of the sculpture object 410 next to the sculpture object 412 further increases the distinctiveness of the pair as the distinctiveness of either object can be based not only on the individual distinctiveness of each object, but also on the distinctiveness of both objects as part of a pair of objects. Accordingly, combinations of features can be associated with a semantic tag (e.g., a semantic tag describing "a pair of relief sculptures"). Additionally, the sculpture object 410 and the sculpture object 412 are visually constant since the sculptures are carved in granite (a hard-wearing stone) and change minimally over time. Further, the sculpture object 410 and the sculpture object 412 are part of the building object 402 and firmly attached to the building object 402 and remain at the same location over time which makes the sculpture object 410 and the sculpture object 412 more apt to be selected as a landmark.

Furthermore, with respect to context associated with the sculpture object 410 and the sculpture object 412 (e.g., context associated with information that can be included in the context data described in the method 700 that is depicted in FIG. 7), the sculpture object 410 and the sculpture object 412 are located at a height that is readily visible from ground level. The image of the sculpture object 410 and the sculpture object 412 is captured during a time at which day light allows the sculpture object 410 and the sculpture object 412 to be clearly visible without additional light. Neither the sculpture object 410 nor the sculpture object 412 include a light source and are not positioned in in a location at which an external light source with illuminate the sculpture object 410 or the sculpture object 412 at night. As such, when one or more landmarks are selected (e.g., selected by the computing device 102) at the vantage point at which the image 400 was captured, the sculpture object 410 and the sculpture object 412 are more apt to be included than the other potential landmarks in the image 400 that occur more frequently, are less prominent, and/or are less distinctive.

A semantic tag associated with the signage object 414 can be used to indicate that the signage object 414 is associated with a type of object that occurs frequently (e.g., there are many signs of various sizes and shapes on buildings throughout the city in which the image 400 was captured) and that the signage object 414 has low distinctiveness (e.g., from a distance the signage object 414 looks like many other different signs and there are other signs that appear the same as the signage object 414). Further, with respect to prominence, the signage object 416 is not very large, does not occupy a prominent position, and may be difficult to discern from a longer distance or from an angle that is not close to being directly in front of the signage object. The signage object 414 is itself visually constant with minimal changes in appearance over time. However, exposure to the elements (e.g., snow cover) can significantly alter the visibility of the signage object 414. Further, the signage object 414 is at a location that is constant over time which makes the signage object 414 more apt to be selected as a landmark.

Furthermore, with respect to context associated with the signage object 414 (e.g., context associated with information that can be included in the context data described in the method 700 that is depicted in FIG. 7), the image of the signage object 414 is captured during a time at which day light allows the signage object 414 to be clearly visible without additional light (e.g., a street lamp). The signage object 414 includes a light source that can be used to illuminate the signage object 414 when darkness falls. As such, when one or more landmarks are selected (e.g., selected by the computing device 102) at the vantage point at which the image 400 was captured, the signage object 414 is less apt to be included than the other potential landmarks in the image 400 that occur less frequently, are more prominent, and are more distinctive.

A semantic tag associated with the address object 416 can be used to indicate that the address object 416 is associated with a type of object that occurs frequently (e.g., there are many street address signs of various sizes and shapes on buildings, poles, and other structures throughout the city in which the image 400 was captured) and that the address object 416 has low distinctiveness (e.g., from a distance the address object 416 looks like many other address signs and there are other signs inscribed with the number "107" that appear the same as the address object 416). Further, with respect to prominence, the address object 416 is small in size and can be difficult to discern from a distance. The address object 416 is itself visually constant, with minimal changes in appearance over time. Further, a heating element in the address object 416 prevents the address object 416 from being obscured due to environmental conditions including snow or frost. Further, the address object 416 has a constant location over time which makes the address object 416 more apt to be selected as a landmark.

Furthermore, with respect to context associated with the address object 416 (e.g., context associated with information that can be included in the context data described in the method 700 that is depicted in FIG. 7), the image of the address object 416 is captured during a time at which day light allows the address object 416 to be clearly visible without additional light (e.g., a street lamp). However, the address object 416 does not include its own light source, nor is the address object 416 illuminated by an external light source (e.g., a street lamp) at night. As such, when one or more landmarks are selected (e.g., selected by the computing device 102) at the vantage point at which the image 400 was captured, the address object 416 is less apt to be included than the other potential landmarks in the image 400 that occur less frequently, are more distinctive, and are more prominent. By way of example, the computing device 102 depicted in FIG. 1 can select at least one of the objects 410/412/414/416 as a landmark for use as a navigational instruction (e.g., the navigational instruction described in the method 700 depicted in FIG. 7).

Figure 5:
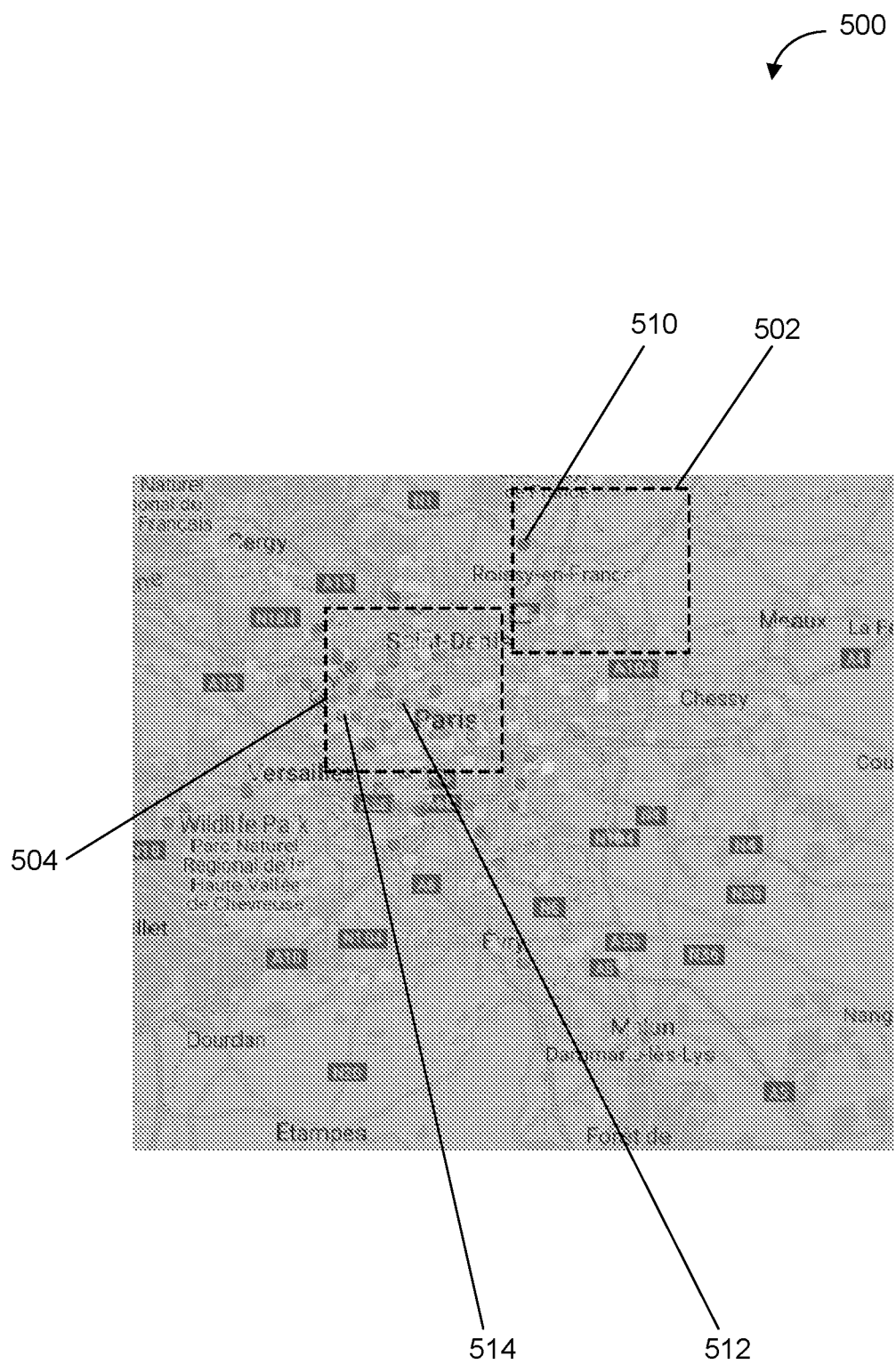
FIG. 5 depicts an example of landmark identification according to example embodiments of the present disclosure.

FIG. 5 depicts an example of landmark identification according to example embodiments of the present disclosure. The output illustrated in FIG. 5 can be generated and/or determined by a computing device or computing system that includes one or more features of the computing device 102, the server computing system 130, and/or the training computing system 150, which are depicted in FIG. 1. As shown in FIG. 5, the image 500 includes a region 502, a region 504, an object 510, an object 512, and an object 514.

The image 500 is a map of an area (Paris and the environs surrounding Paris) including representations of locations associated with one or more semantic tags (e.g., one or more semantic tags that include one or more features of the plurality of semantic tags described in the method 700 that is depicted in FIG. 7) that denote locally prominent landmarks. In this example, the objects 510/512/514 are the location of fountains (e.g., fountains with one or more features of the fountain object 312 that is depicted in FIG. 3) that are locally prominent. The region 502, which includes the object 510, includes fewer fountains than the region 504 which has an abundance of fountains including the object 512 and the object 514. In determining a locally prominent landmark to select for use in navigation, the frequency at which an object associated with a semantic tag occurs can influence the selection of the object for use as a landmark, with less frequently occurring objects more apt to be selected as a landmark than more commonly occurring objects. Accordingly, all other things being equal, the object 510 is more likely to be selected for use as a landmark in the region 502 than in the region 504. For example, the computing device 102 depicted in FIG. 1 can select one of the objects 502/504/506 as a landmark for use as a navigational instruction (e.g., the navigational instruction described in the method 700 depicted in FIG. 7).

Figure 6:
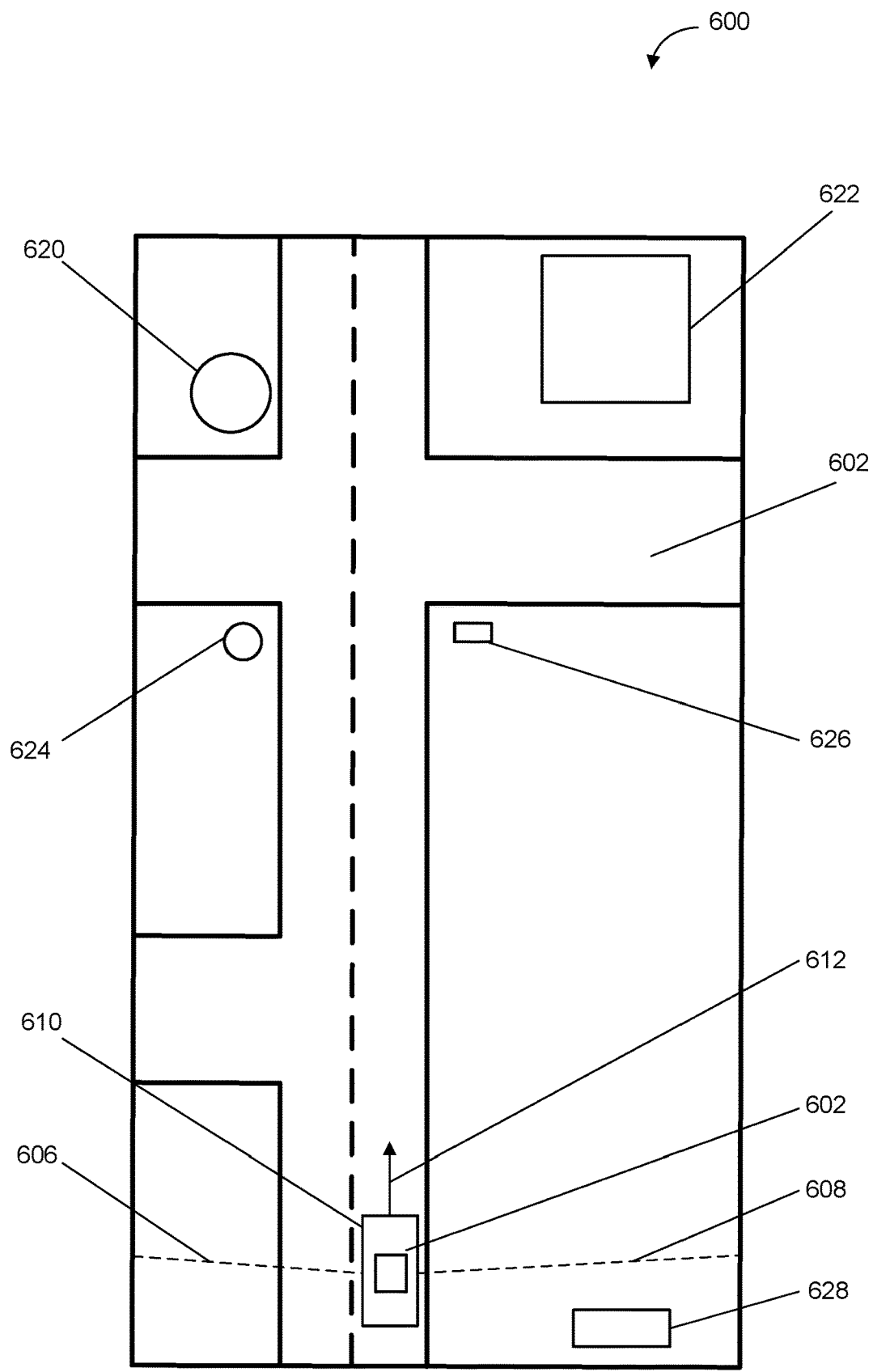
FIG. 6 depicts an example of landmark identification in an environment according to example embodiments of the present disclosure.

FIG. 6 depicts an example of landmark identification in an environment according to example embodiments of the present disclosure. One or more operations in the environment depicted in FIG. 6 can be performed by a computing device or computing system that includes one or more features of the computing device 102, the server computing system 130, and/or the training computing system 150, which are depicted in FIG. 1. As shown in FIG. 6, the environment 600 includes a computing system 602, a road 604, a field of view threshold 606, a field of view threshold 608, a vantage point 610, a direction of travel 612, a tree object 620, a monument object 622, a lamppost object 624, a street sign object 626, and a park bench object 628.

In this example, the computing system 602 includes one or more features of the computing device 102 and is located inside the vantage point 610 which is a vehicle that is travelling on the road 604 along a travel path corresponding to the direction of travel 612. The vantage point 610 includes one or more sensors including cameras that provide a view of the environment 600 that captures the portion of the environment 600 that is in front of the field of view threshold 606 and the field of view threshold 608. Further, the field of view 606/608 delineate a boundary that divides the environment 600 into: a first region that includes the street sign object 626, in which objects can be selected for use as a landmark; and a second region that includes the park bench object 628, in which objects cannot be selected for use as a landmark.

From the vantage point 610, the objects associated with semantic tags include the park bench 628 object which is a park bench that is outside the field of view of the one or more sensors of the computing system 602 and will not be selected as a potential landmark since park bench is outside of the field of view and the vantage point 610 is moving away from the park bench object 628. In some embodiments, an object that is behind a viewer that is moving away from the object may be of lesser value for use as a navigational instruction. Within the field of view from the vantage point 610 are the tree object 620 which is a maple tree, the monument object 622 which is a monument on a high pedestal including a large bronze statue of a rider garbed in Napoleonic era attire and mounted on a horse, the lamp post object 624 which is a small lamp post, and the street sign object 626 which is a stop sign.

In this example, the monument object 622 is selected for use as a landmark due to its rarity (e.g., the monument is one of a kind and the occurrence of similar monuments is low), prominence (e.g., the monument is large and mounted on a high pedestal), distinctiveness (e.g., the monument has a uniquely distinctive appearance), and its location which is within the field of view from the vantage point 610.

FIG. 7 depicts a flow diagram of providing navigational instructions that reference landmarks according to example embodiments of the present disclosure. One or more portions of the method 700 can be executed or implemented on one or more computing devices or computing systems including, for example, the computing device 102, the server computing system 130, and/or the training computing system 150. Further, one or more portions of the method 700 can be executed or implemented as an algorithm on the hardware devices or systems disclosed herein. FIG. 7 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 702, the method 700 can include accessing a plurality of semantic tags associated with a plurality of images. Each semantic tag of the plurality of semantic tags can be associated with one or more features depicted by one of the plurality of images. For example, each semantic tag can include a semantic description of an object included within a scene depicted by one of the plurality of images. Further, each feature of the one or more features can be associated with a geographic location. The plurality of images can include one or more digital images (e.g., a two dimensional image) of a portion of an environment (e.g., an image of a set of objects at a particular location in an environment).

The plurality of images can be encoded in any type of image format including a combination of raster images (e.g., bitmaps comprising a grid of pixels) and/or vector images (e.g., polygonal representations of images based on positions of coordinates including x and y axes of a two-dimensional plane). The images can include still images, image frames from a movie, and/or other types of imagery including LIDAR imagery, RADAR imagery, and/or other types of imagery.

Examples of digital image formats used by the plurality of images can include JPEG (Joint Photographic Experts Group), BMP (Bitmap), TIFF (Tagged Image File Format), PNG (Portable Network Graphics), and/or GIF (Graphics Interchange Format). The images can be collected from various sources such as user-submitted imagery, imagery in the public domain (e.g., obtained via web crawl and properly aggregated and anonymized), street-level panoramic imagery collected from various sources including user devices (e.g., smart phones with cameras), and/or other sources of images.

The plurality of semantic tags associated with the images can be associated with one or more features including: physical dimensions (e.g., physical dimensions of objects in an image including the height, length, and/or width of an object); descriptions (e.g., descriptions including one or more manually created descriptions and/or one or more descriptions generated by a content analysis system which can include one or more features of the computing device 102, the server computing system 130, and/or the training computing system 150) and/or object identifiers (e.g., the identity of objects depicted in the one or more images). For example, an identifier for the Eiffel tower in Paris, France can include an identifier associated with the name of the Eiffel tower in English, "Eiffel tower" as well as the name of the Eiffel in French "La tour Eiffel". Furthermore, semantic tags associated with the Eiffel tower can include information associated with the Eiffel tower including physical dimensions (e.g., the height of the Eiffel tower), color (e.g., brown), and semantic tags associated with the type of structure (e.g., building, tower, tourist attraction, and monument). Additional information associated with any of the plurality of images and/or the plurality of semantic tags can include: a location (e.g., a street address and/or an altitude, latitude, and longitude associated with an image); a time of day (e.g., a time of day when an image was captured); a date (e.g., a date when an image was captured);

By way of example, the computing device 102 can access locally stored data (e.g., data stored in a storage device of the computing device 102) including information associated with the plurality of semantic tags and the plurality of images. Further, the computing device 102 can access (e.g., access via the network 180) data (e.g., the plurality of images and/or the plurality of semantic tags) stored on a remote storage device (e.g., a storage device of the server computing system 130 and/or the training computing system 150).

By way of further example, the computing device 102 can receive data including information associated with the plurality of semantic tags and the plurality of images via a communication network (e.g., a wireless and/or wired network including a LAN, WAN, or the Internet) through which one or more signals (e.g., electronic signals) and/or data can be sent and/or received. The computing device 102 can, for instance, receive the plurality of images and/or the plurality of semantic tags from the server computing system 130 and/or the training computing system 150, via the network 180.

In some embodiments, each of the one or more features can be associated with a time of day (e.g., an hour, minute, and second of the day), a season (e.g., winter, summer, spring, or autumn), a visual constancy (e.g., the extent to which the one or more features appear the same over time), and/or one or more locations from which each of the one or more features is visible (e.g., geographic locations including a latitude, longitude, and/or altitude from which each feature is visible). For example, the visual constancy of an existing building can be associated with the size of the building remaining the same over time (e.g., from month to month or year to year). As such, a building that is under construction and has only a building foundation at inception, a bare steel frame structure after two months, and a completed façade after three months would have a lower visual constancy than a fully constructed building that has had minimal structural changes over time.

At 704, the method 700 can include identifying, based at least in part on the plurality of semantic tags, one or more landmarks that include the one or more features that satisfy one or more entropic criteria that measure one or more characteristics of the one or more features including a localized prominence of each of the one or more features. For example, the computing device 102 can access data associated with the plurality of semantic tags that indicates the one or more landmarks in an area. Further, the one or more landmarks can be associated with one or more features (e.g., physical dimensions or shape) that can be compared to one or more entropic criteria that can be used to identify the one or more landmarks.

The one or more entropic criteria can be associated with the frequency with which each of the one or more features occurs in the area (e.g., the rate of occurrence of the one or more features), the distinctiveness of each feature (e.g., the extent to which each feature is different from other features in the area), the prominence of each feature (e.g., how prominent a feature is in terms of physical dimensions and/or visibility), the visual constancy of a feature (e.g., how much the feature changes visually over time), and/or a locational persistence of the feature (e.g., the extent to which the feature will remain at the same location over time). Satisfaction of the one or more entropic criteria can be based, for example, on a feature being infrequent (e.g., the only flag post in an area or one of two tall buildings in an area). For example, the one or more entropic criteria can be applied to semantic tags associated with images. For example, the one or more entropic criteria can be applied to the semantic tags associated with the image 300 to determine that the fountain object 312 satisfies the one or more entropic criteria based in part on its lower frequency, greater distinctiveness, and greater prominence in comparison to the other objects in the image 300. By way of further example, the one or more entropic criteria can be applied to the semantic tags associated with the image 400 to determine that the sculpture object 410 and the sculpture object 412 satisfy the one or more entropic criteria based in part on their lower frequency, greater distinctiveness, and greater prominence in comparison to the other objects in the image 400

By way of example, clustering or other algorithmic techniques can be used to determine a rarity or infrequency associated with each feature, which can then be used to guide selection of features for use as landmarks. As one example, for each location, an area around the location can be analyzed to identify which features associated with the location are most rare (e.g., a histogram of semantic tags in an area around a vantage point location might determine that a monument with a rider mounted on a horse occurs once while a set of traffic lights occurs twenty times, thereby indicating that the monument has higher entropy value and is a better choice for use as a landmark). By way of further example, satisfaction of the one or more entropic criteria can include the distinctiveness of various characteristics of a feature with respect to other similar features in the area (e.g., a small house located on one corner of an intersection with four corners will contrast with, and be more distinctive than, high-rise buildings located on the other three corners).

Landmarks can thus be determined from the semantic tag statistics aggregated geographically and over time for each location by focusing on "tags" of high entropy, e.g., those tags associated with the one or more features that appear to persist in time and may exhibit highly localized prominence. Thus, the system can identify tags that are high confidence at the location, but comparatively unusual or rare in the surrounding area.

In some embodiments, the one or more entropic criteria can include a frequency of occurrence of each of the one or more features within a predetermined area not exceeding a predetermined threshold frequency (e.g., the number of times the one or more features occur per unit of area), a temporal persistence (e.g., how long a feature has been present in a particular area) of each of the one or more features at a location exceeding a predetermined threshold duration, and/or a size (e.g., one or more physical dimensions) of each of the one or more features exceeding a threshold size. For example, a feature (e.g., a statue) occurring more than once in a twenty meter by twenty square meter area could exceed a predetermined threshold frequency of a statue occurring no more than once in a fifty by fifty square meter area.

At 706, the method 700 can include selecting, based at least in part on context data associated with a location on a path including a plurality of locations, at least one landmark for use in navigation at the location. For example, the computing device 102 can determine a context including the time of day, season, and/or an amount of traffic proximate to a vantage point. Based on, for example, context indicating that a heavy fog has enveloped the area around the location, the computing device 102 can select a landmark that is brightly illuminated.

By way of further example, the computing device 102 can determine that the context data indicates that the season is winter and that the area around the location is covered in snow. Based on some portion of the landmarks being covered in snow, the computing device 102 can select at least one landmark that is locally prominent when covered in snow or that is situated such that the at least one landmark is not covered in snow. For example, a very tall building (the tallest building in the area) may not be covered in snow and thus could remain locally prominent, whereas a distinctive mural on a wall may not be visible due to snow cover.

Furthermore, the amount of traffic proximate to a vantage point can be determined by the computing device 102 based on one or more outputs from the sensor array 228 which can include one or more cameras that can detect the amount of traffic (e.g., foot traffic and/or vehicular traffic) and other activity (e.g., construction) proximate to the vantage point. The computing device 102 can select at least one landmark based on the amount of traffic detected by the sensor array 228.

At 708, the method 700 can include generating at least one navigational instruction that references the at least one landmark. The at least one navigational instruction can include one or more visual instructions (e.g., textual instructions displayed on a display device) and/or one or more audible instructions (e.g., instructions emitted from an audio output device).

For example, the computing device 102 can generate one or more visual instructions including textual instructions that are displayed on a display device (e.g., a flat panel display). The textual instructions can, for example, describe the appearance of a landmark (e.g., "a large white building with a row of Ionic columns") and the location of the landmark (e.g., "straight ahead"). Furthermore, in some embodiments, the one or more visual instructions can include one or more images associated with the landmark. For example, the textual instructions of the "large white building with a row of Ionic columns" can be accompanied by an image of the building. Furthermore, the image of the large white building with the row of Iconic columns included in the one or more visual instructions may be generated based at least in part on the location of the vantage point with respect to the landmark. For example, when a landmark is a four-sided building, the image associated with the one or more visual instructions can be an image of the side of the building that is visible from the vantage point.

By way of further example, the computing device 102 can generate one or more audible instructions describing the appearance of a landmark (e.g., "an ornate gate emblazoned with a lion and a dragon") and the location of the landmark (e.g., "on your left at the next intersection"). Further, the one or more audible instructions can be the same as the one or more visual instructions (e.g., when the one or more visual instructions visually indicate "a red building on the right" the one or more audio instructions can indicate "a red building on the right"). In other embodiments, the one or more audible instructions can be different from the one or more visual instructions (e.g., when the one or more visual instructions visually indicate "a red building on the right" the one or more audio instructions can indicate "a large red building next to a small white building").

In some embodiments, the at least one audible instruction can be generated at a volume level that is associated with a proximity of the at least one landmark with respect to the vantage point. For example, the one or more audible instructions can be generated at a volume inversely proportional to the distance between the vantage point and the at least one landmark (e.g., the volume of the one or more audible instructions increases as the distance to the at least one landmark decreases).

Figure 8:
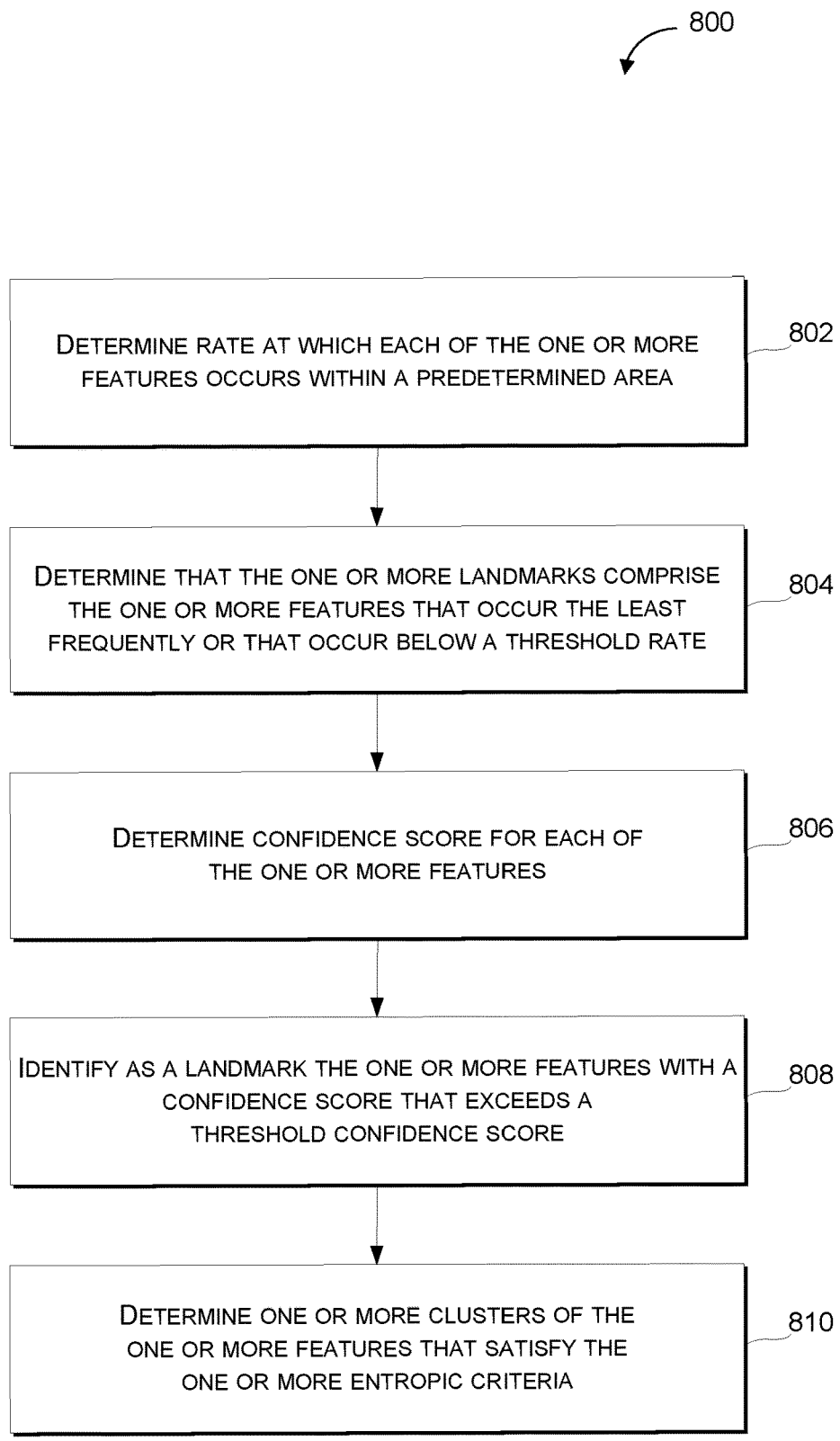
FIG. 8 depicts a flow diagram of providing navigational instructions that reference landmarks according to example embodiments of the present disclosure.

FIG. 8 depicts a flow diagram of providing navigational instructions that reference landmarks according to example embodiments of the present disclosure. One or more portions of the method 800 can be executed or implemented on one or more computing devices or computing systems including, for example, the computing device 102, the server computing system 130, and/or the training computing system 150. Further, one or more portions of the method 800 can be executed or implemented as an algorithm on the hardware devices or systems disclosed herein. In some embodiments, one or more portions of the method 800 can be performed as part of the method 700 that is depicted in FIG. 7. FIG. 8 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 802, the method 800 can include determining, based at least in part on the plurality of semantic tags, a rate at which each of the one or more features occurs within a predetermined area. Further, the one or more features can include: individual features including the size of an object or the brightness of illuminated objects; and combinations of the one or more features including combinations of colors and/or shapes. For example, the computing device 102 can determine a rate at which a combination of features (e.g., a bright yellow colored stylized letter of the alphabet) occurs within a one square kilometer area. Further, the one or more features can be associated with semantic tags for an alphabetical letter (e.g., the letter "N"), a particular color (e.g., bright yellow), and an establishment associated with the features (e.g., a bank, restaurant, or other business). The computing device 102 can determine that the combination of features occurs once within the one square kilometer area.

In some embodiments, determining, based at least in part on the plurality of semantic tags, a rate at which each of the one or more features occurs within a predetermined area can be used in identifying, based at least in part on the plurality of semantic tags, one or more landmarks that include the one or more features that satisfy one or more entropic criteria that measure a localized prominence of each of the one or more features as described in 704 of the method 700 that is depicted in FIG. 7.

At 804, the method 800 can include determining that the one or more landmarks include the one or more features that occur the least frequently or that occur at a rate below a threshold rate. For example, in determining a restaurant to use as a landmark among a group of restaurants, the computing device 102 can determine that the restaurant that occurs the least frequently among other restaurants in the area will be included in the one or more landmarks. By way of further example, in determining an object to use as a landmark, the computing device 102 can determine that a prominent sculpture that occurs at a rate below a threshold rate (e.g., a threshold rate of one occurrence per square kilometer) will be included in the one or more landmarks.

In some embodiments, determining that the one or more landmarks include the one or more features that occur the least frequently or that occur at a rate below a threshold rate can be used in identifying, based at least in part on the plurality of semantic tags, one or more landmarks that include the one or more features that satisfy one or more entropic criteria that measure a localized prominence of each of the one or more features as described in 704 of the method 700 that is depicted in FIG. 7.

At 806, the method 800 can include determining a confidence score for each of the one or more features based at least in part on a number of times that each respective feature of the one or more features has been associated with a semantic tag of the plurality of semantic tags. For example, the computing device 102 can access data associated with the number of times that each feature of the one or more features has been tagged with the same tag or a related set of tags (e.g., a set of tags including a window tag can also include a porthole tag). A feature tagged with the same feature a greater number of times can be associated with a higher confidence score and a feature tagged with a feature a lower number of times can be associated with a lower confidence score.

In some embodiments, determining a confidence score for each of the one or more features based at least in part on a number of times that each respective feature of the one or more features has been associated with a semantic tag of the plurality of semantic tags can be used in identifying, based at least in part on the plurality of semantic tags, one or more landmarks that include the one or more features that satisfy one or more entropic criteria that measure a localized prominence of each of the one or more features as described in 704 of the method 700 that is depicted in FIG. 7.

At 808, the method 800 can include identifying as a landmark, the one or more features with a confidence score that satisfy one or more confidence score criteria. For example, the computing device 102 can identify as a landmark, the one or more features with a confidence score that is equal to or exceeds a threshold confidence score.

In some embodiments, the confidence score can be based at least in part on a number of different perspectives from which each of the one or more features associated with a semantic tag has been viewed (e.g., semantic tags associated with images of the same object viewed from various angles, perspectives, and/or distances), and/or a recency (e.g., the amount of time that has elapsed since the one or more features were associated with the semantic tag) with which the one or more features have been associated with a semantic tag.

In some embodiments, identifying as a landmark, the one or more features with a confidence score that satisfy one or more confidence score criteria can be used in identifying, based at least in part on the plurality of semantic tags, one or more landmarks that include the one or more features that satisfy one or more entropic criteria that measure a localized prominence of each of the one or more features as described in 704 of the method 700 that is depicted in FIG. 7.

At 810, the method 800 can include determining one or more clusters of the one or more features that satisfy the one or more entropic criteria. Further, each of the one or more clusters can include the one or more features that have a common semantic type. For example, the computing device 102 can determine clusters of buildings that can satisfy one or more entropic criteria associated with a building density for the cluster of buildings (e.g., the number of buildings within a predetermined area, a predetermined radius from the vantage point, or within a predetermined number of blocks).

In some embodiments, determining one or more clusters of the one or more features that satisfy the one or more entropic criteria can be used in identifying, based at least in part on the plurality of semantic tags, one or more landmarks that include the one or more features that satisfy one or more entropic criteria that measure a localized prominence of each of the one or more features as described in 704 of the method 700 that is depicted in FIG. 7.

Figure 9:
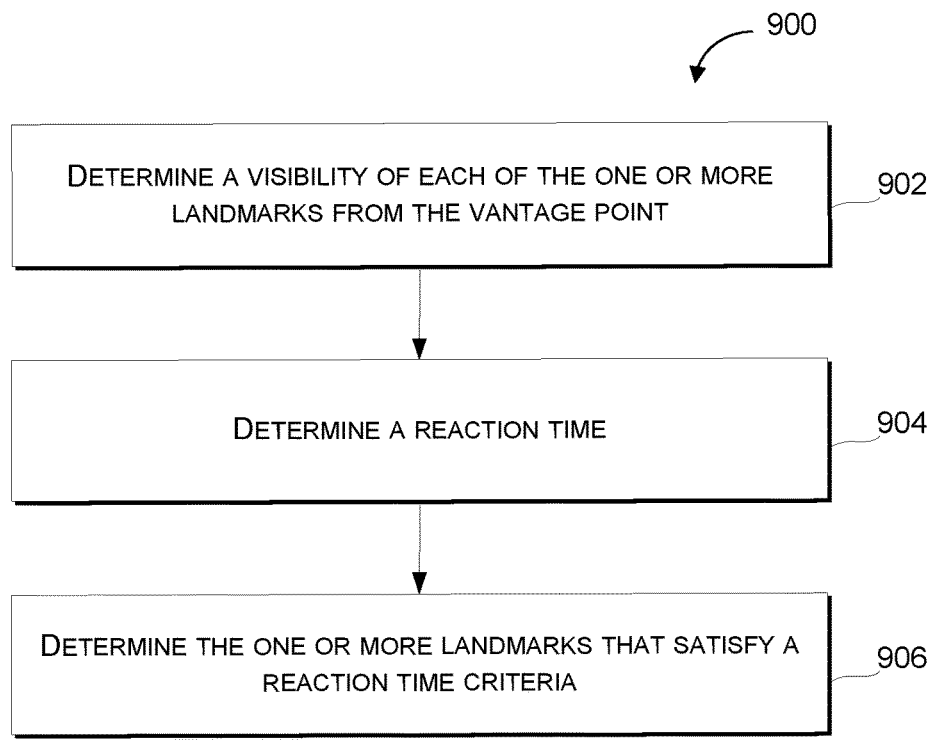
FIG. 9 depicts a flow diagram of providing navigational instructions that reference landmarks according to example embodiments of the present disclosure.

FIG. 9 depicts a flow diagram of providing navigational instructions that reference landmarks according to example embodiments of the present disclosure. One or more portions of the method 900 can be executed or implemented on one or more computing devices or computing systems including, for example, the computing device 102, the server computing system 130, and/or the training computing system 150. Further, one or more portions of the method 900 can be executed or implemented as an algorithm on the hardware devices or systems disclosed herein. In some embodiments, one or more portions of the method 900 can be performed as part of the method 700 that is depicted in FIG. 7. FIG. 9 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 902, the method 900 can include determining a visibility of each of the one or more landmarks from the vantage point associated with the location. Further, the context data can include a vantage point (e.g., a point within the location from which portions of the surrounding environment can be viewed) associated with the location. For example, the computing device 102 can determine the one or more landmarks that are visible from the vantage point based in part on a distance to each of the one or more landmarks (e.g., visibility can decrease with greater distance to a landmark), whether each of the one or more landmarks is obstructed by other objects (e.g., trees obstructing a landmark), a height of each of the one or more landmarks (e.g., a very tall building that is four hundred meters tall can be more visible than a low-rise building that is twenty meters tall).

In some embodiments, the visibility can be based at least in part on a distance from which each of the one or more landmarks is visible from the vantage point, an amount of light that is cast on each of the one or more landmarks (e.g., an amount of light emitted by street lamps proximate to the one or more landmarks, and/or an amount emitted by a light source included in each of the one or more landmarks), any obstructions between the vantage point and the one or more landmarks, and/or physical dimensions of each of the one or more landmarks (e.g., the height of a building).

In some embodiments, determining a visibility of each of the one or more landmarks from the vantage point associated with the location can be used in selecting, by the computing system, based at least in part on context data associated with a location on a path including a plurality of locations, at least one landmark for use in navigation at the location as described in 706 of the method 700 that is depicted in FIG. 7.

At 904, the method 900 can include determining a reaction time based at least in part on a velocity at the location and a distance to a closest landmark of the one or more landmarks. For example, the computing device 102 can determine the reaction time based on the amount of time that it will take to reach the location of a landmark at a current velocity. Accordingly, when the vantage point is stationary (e.g., standing in one place or sitting in a stationary automobile) the reaction time will be greater than when the vantage point is in an automobile travelling at one hundred kilometers per hour.

In some embodiments, the reaction time can be based at least in part on a mode of transportation associated with the vantage point. Furthermore, the mode of transportation can include a motor vehicle, a bicycle, and/or foot travel. For example, the reaction time for a slower mode of transportation (e.g., cycling) can be of longer duration than the reaction time for a faster mode of transportation (e.g., riding on a bus).

Further, in some embodiments, the reaction time can vary based on whether the vantage point is associated with a driver of a vehicle or a passenger of a vehicle. When the vantage point is associated with the driver of a vehicle the reaction time can be less than when the vantage point is associated with the passenger of a vehicle.

In some embodiments, determining a reaction time based at least in part on a velocity at the location and a distance to a closest landmark of the one or more landmarks can be used in selecting, based at least in part on context data associated with the location on the path including the plurality of locations, at least one landmark for use in navigation at the location as described in 706 of the method 700 that is depicted in FIG. 7.

At 906, the method 900 can include determining the one or more landmarks that satisfy one or more reaction time criteria associated with a minimum reaction time. For example, the computing device 102 can determine that the minimum reaction time is five seconds and that the one or more landmarks are selected from the one or more landmarks that will be visible for more than five seconds after the current time.

In some embodiments, determining the one or more landmarks that satisfy one or more reaction time criteria associated with a minimum reaction time can be used in selecting, based at least in part on context data associated with the location on the path including the plurality of locations, at least one landmark for use in navigation at the location as described in 706 of the method 700 that is depicted in FIG. 7.

Figure 10:
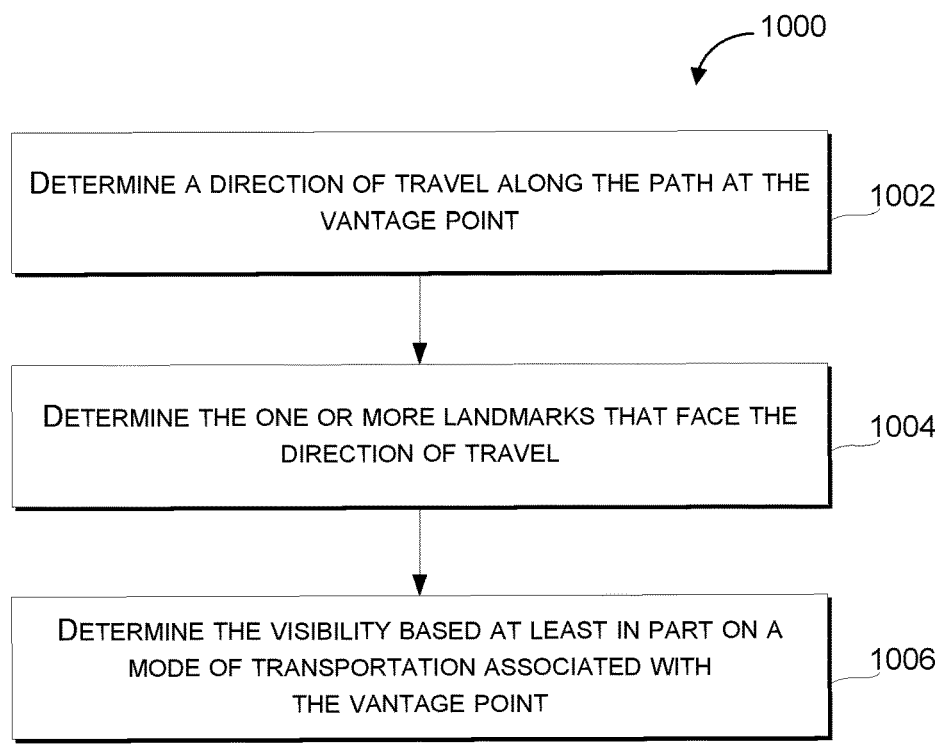
FIG. 10 depicts a flow diagram of providing navigational instructions that reference landmarks according to example embodiments of the present disclosure.

FIG. 10 depicts a flow diagram of providing navigational instructions that reference landmarks according to example embodiments of the present disclosure. One or more portions of the method 1000 can be executed or implemented on one or more computing devices or computing systems including, for example, the computing device 102, the server computing system 130, and/or the training computing system 150. Further, one or more portions of the method 1000 can be executed or implemented as an algorithm on the hardware devices or systems disclosed herein. In some embodiments, one or more portions of the method 1000 can be performed as part of the method 900 that is depicted in FIG. 9 and/or as part of the method 700 that is depicted in FIG. 7. FIG. 10 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1002, the method 1000 can include determining a direction of travel along the path at the vantage point. Further, the visibility of each of the one or more landmarks can be associated with a field of view (e.g., a field of view associated with the area in which the one or more landmarks are visible) from the vantage point that is associated with the direction of travel (e.g., a field of view equal to a predetermined angle relative to a line corresponding to the direction of travel). By way of further example, in the environment 600 depicted in FIG. 6, the field of view threshold 606 and the field of view threshold 608 can be associated with the visibility from the vantage point 610 when travelling along the direction of travel 612.

In some embodiments, determining a direction of travel along the path at the vantage point can be used in determining a visibility of each of the one or more landmarks from the vantage point associated with the location as described in 902 of the method 900 that is depicted in FIG. 9.

At 1004, the method 1000 can include determining, the one or more landmarks that face the direction of travel. For example, the computing device 102 can determine that the one or more landmarks that face the direction of travel (e.g., the one or more landmarks that are visible from in front of the vantage point) are more visible than the one or more landmarks that do not face the direction of travel (e.g., the one or more landmarks that are not visible from in front of the vantage point). For example, in the environment 600 depicted in FIG. 6, the tree object 624 is more visible than the park bench object 628 that does not face the direction of travel 612 of the vantage point 610.

In some embodiments, determining, the one or more landmarks that face the direction of travel can be used in determining a visibility of each of the one or more landmarks from the vantage point associated with the location as described in 902 of the method 900 that is depicted in FIG. 9.

At 1006, the method 1000 can include determining the visibility based at least in part on a mode of transportation associated with the vantage point. For example, the computing device 102 can determine that the visibility from an open top vehicle (e.g., a convertible automobile or the top of an open-air tour bus) is greater than the visibility from the inside of an enclosed vehicle (e.g., an automobile with a permanent roof).

In some embodiments, determining the visibility based at least in part on a mode of transportation associated with the vantage point can be used in determining a visibility of each of the one or more landmarks from the vantage point associated with the location as described in 902 of the method 900 that is depicted in FIG. 9.

Figure 11:
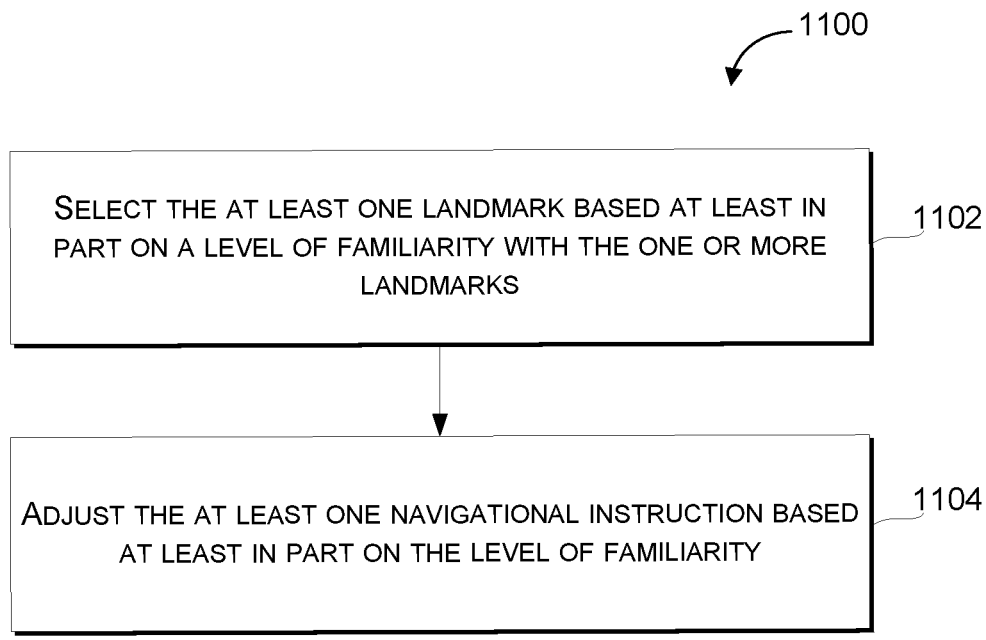
FIG. 11 depicts a flow diagram of providing navigational instructions that reference landmarks according to example embodiments of the present disclosure.

FIG. 11 depicts a flow diagram of providing navigational instructions that reference landmarks according to example embodiments of the present disclosure. One or more portions of the method 1100 can be executed or implemented on one or more computing devices or computing systems including, for example, the computing device 102, the server computing system 130, and/or the training computing system 150. Further, one or more portions of the method 1100 can be executed or implemented as an algorithm on the hardware devices or systems disclosed herein. In some embodiments, one or more portions of the method 1100 can be performed as part of the method 700 that is depicted in FIG. 7. FIG. 11 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1102, the method 1100 can include selecting the at least one landmark based at least in part on a level of familiarity with the one or more landmarks. Further, the level of familiarity can be based at least in part on the user's previous association with the location or the one or more features of the one or more landmarks. For example, the level of familiarity can be greater when a user has previously visited the location (e.g., the user has been to the same neighborhood in the past) and/or previously viewed a different landmark (e.g., a department store with a distinctively colored logo and physical exterior) that has a similar set of the one or more features as a landmark of the one or more landmarks (e.g., a department store with the same distinctively colored logo and physical exterior).

In some embodiments, the level of familiarity can be associated with a number of times and/or frequency that a user (e.g., a user associated with the navigation computing device) has previously been at the location (e.g., within a threshold distance of the location). For example, the context data can include a record of the number of times a user has travelled past each of the one or more landmarks. The computing device 102 can then determine when the number of times a user has travelled past a landmark satisfies one or more familiarity criteria (e.g., a threshold minimum number of times passing the landmark), and select a landmark that satisfies the one or more familiarity criteria.

In some embodiments, the level of familiarity can be associated with a portion of the one or more features (e.g., a number of one or more visual characteristics) each of the one or more landmarks has in common with another landmark the user has previously viewed (e.g., viewed at a time preceding the time the one or more landmarks were viewed from the vantage point). Further, the user's level of familiarity for a landmark the user has viewed from the vantage point can be greater when the landmark shares a predetermined portion (e.g., ninety percent of the one or more features) of the one or more features with a different landmark the user has previously viewed.

For example, the level of familiarity for a currently viewed landmark that is a restaurant associated with a chain of restaurants that share one or more features (e.g., similar design features including the same or similar logo, signage, exterior color scheme, and/or exterior masonry) will be greater when the user has previously observed another landmark (e.g., another restaurant) that belongs to the same chain of restaurants and shares the same features. Furthermore, the determination of the landmarks that the user has previously viewed can be based on information (e.g., information the user has agreed to provide that is maintained in a privacy enhancing and secure manner) including user travel history (e.g., locations the user has previously visited), direct user input with respect to landmarks (e.g., the user provides information on the landmarks that the user is familiar with), and/or user affiliations based at least in part on past user interactions and/or associations with a landmark (e.g., the user has provided information indicating the user's membership in an organization associated with the landmark).

In some embodiments, the context data can include information associated with a time of day, a season, a language (e.g., English, Spanish, and/or Japanese), the one or more features visible from the location, and/or a mode of transportation (e.g., personal automobile, bus, bicycle, and/or foot travel).

Furthermore, in some embodiments, the context data can include information associated with whether an occupant of a vehicle is a driver or a passenger. For example, when the context data indicates that an occupant of a vehicle is a driver the one or more landmarks can include one or more landmarks more readily visible from the driver's side of the vehicle. By way of further example, when the context data indicates that an occupant of a vehicle is a passenger, the one or more landmarks can include one or more landmarks more readily visible from various passenger seating locations.

In some embodiments, selecting the at least one landmark based at least in part on a level of familiarity with the one or more landmarks can be used in selecting, based at least in part on context data associated with the location on the path including the plurality of locations, at least one landmark for use in navigation at the location as described in 706 of the method 700 that is depicted in FIG. 7.

At 1104, the method 1100 can include adjusting the at least one navigational instruction based at least in part on the level of familiarity. For example, the computing device 102 can access information associated with the at least one landmark (e.g., a nickname for a landmark or a former name of a landmark) and use the information to modify the navigational instruction that is used. By way of further example, the computing device 102 can determine that when the level of familiarity exceeds a threshold level of familiarity associated with a user having passed a landmark greater than a threshold number of times, the navigational instruction will be selected from data (e.g., a semantic tag) including a nickname for a landmark.

In some embodiments, adjusting the at least one navigational instruction based at least in part on the level of familiarity can be used in generating the at least one navigational instruction that references the at least one landmark as described in 706 of the method 700 that is depicted in FIG. 7.

Figure 12:
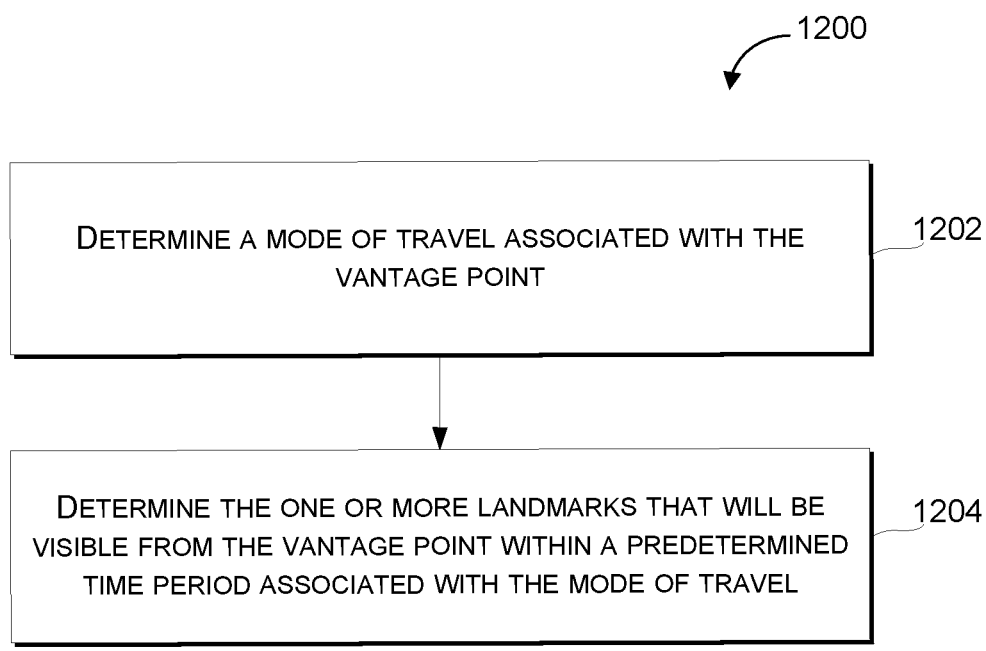
FIG. 12 depicts a flow diagram of providing navigational instructions that reference landmarks according to example embodiments of the present disclosure.

FIG. 12 depicts a flow diagram of providing navigational instructions that reference landmarks according to example embodiments of the present disclosure. One or more portions of the method 1200 can be executed or implemented on one or more computing devices or computing systems including, for example, the computing device 102, the server computing system 130, and/or the training computing system 150. Further, one or more portions of the method 1200 can be executed or implemented as an algorithm on the hardware devices or systems disclosed herein. In some embodiments, one or more portions of the method 1200 can be performed as part of the method 700 depicted in FIG. 7. FIG. 12 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1202, the method 1200 can include determining a mode of travel associated with the vantage point can be used in determining one or more landmarks including the one or more features that satisfy one or more entropic criteria associated with a localized prominence of each of the one or more features. For example, the computing device 102 can access data associated with the mode of transportation associated with the vantage point (e.g., an automobile travelling on a highway) can be used to select one or more landmarks that have greater localized prominence from the highway (e.g., large billboards and advertisements).

In some embodiments, determining a mode of travel associated with the vantage point can be used in determining one or more landmarks including the one or more features that satisfy one or more entropic criteria associated with a localized prominence of each of the one or more features as described in 706 of the method 700 that is depicted in FIG. 7.

At 1204, the method 1200 can include determining, based at least in part on a direction of travel and velocity along the path, the one or more landmarks that will be visible from the vantage point within a predetermined time period associated with the mode of travel. For example, the computing device 102 can determine a velocity associated with the mode of transportation (e.g., a velocity in kilometers per hour when cycling) and determine the landmarks that will be visible from the cyclist's vantage point within the next thirty seconds.

In some embodiments, determining, based at least in part on a direction of travel and velocity along the path, the one or more landmarks that will be visible from the vantage point within a predetermined time period associated with the mode of travel can be used in determining one or more landmarks including the one or more features that satisfy one or more entropic criteria associated with a localized prominence of each of the one or more features as described in 706 of the method 700 that is depicted in FIG. 7.

Figure 13:
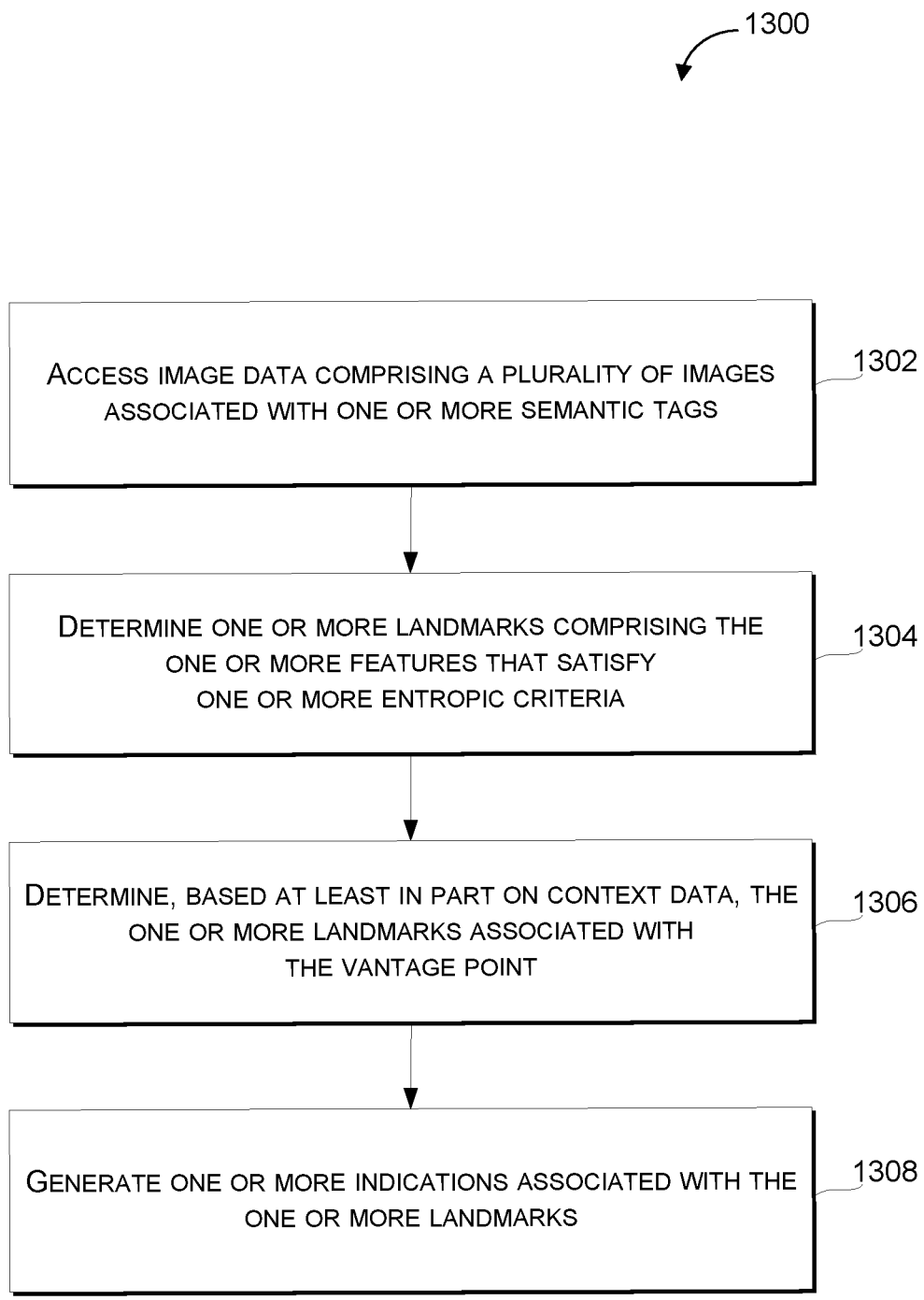
FIG. 13 depicts a flow diagram of providing navigational instructions that reference landmarks according to example embodiments of the present disclosure.

FIG. 13 depicts a flow diagram of providing navigational instructions that reference landmarks according to example embodiments of the present disclosure. One or more portions of the method 1300 can be executed or implemented on one or more computing devices or computing systems including, for example, the computing device 102, the server computing system 130, and/or the training computing system 150. Further, one or more portions of the method 1300 can be executed or implemented as an algorithm on the hardware devices or systems disclosed herein. In some embodiments, one or more portions of the method 1300 can be performed as part of the method 700 that is depicted in FIG. 7. FIG. 13 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1302, the method 1300 can include accessing image data including a plurality of images associated with one or more semantic tags, wherein each of the one or more semantic tags is associated with one or more features of the plurality of images. Further, each of the one or more features can be associated with a geographic location. For example, the computing device 102 can receive image data (e.g., semantically tagged photographs from an image repository) including information associated with the plurality of semantic tags and the plurality of images via a communication network (e.g., the Internet) through which one or more signals (e.g., electronic signals) and/or data can be sent and/or received.

At 1304, the method 1300 can include determining one or more landmarks including the one or more features that satisfy one or more entropic criteria associated with a localized prominence of each of the one or more features. For example, the computing device 102 can access the plurality of semantic tags to determine the one or more landmarks (e.g., objects with features that are distinctive, less common, and/or locally prominent) in an area that include the one or more features (e.g., physical dimensions, color, brightness, and/or shape) that satisfy one or more entropic criteria (e.g., physical dimensions exceeding a physical dimension threshold).

At 1306, the method 1300 can include determining, based at least in part on context data associated with a location of a vantage point on a path including a plurality of locations, the one or more landmarks associated with the vantage point. For example, the computing device 102 can access context data including the time of day, environmental conditions (e.g., rain, snow, fog, hail, and/or level of sunshine), season (e.g., summer, spring, autumn, winter), and/or the location of objects (e.g., latitude, longitude, and/or altitude) between the vantage point and the one or more landmarks. Based on, the context data, the computing device 102 can determine the one or more landmarks that are visible (e.g., determine based on the time of day, pollution level, and amount of precipitation) and that are not partly or wholly obstructed by other objects between the vantage point and each of the one or more landmarks.

At 1308, the method 1300 can include generating navigational data including one or more indications associated with the one or more landmarks. For example, the computing device 102 can generate visual instructions on a heads up display device in a vehicle, including a description of the appearance of a landmark (e.g., "a restaurant shaped like a castle") and the location of the landmark (e.g., "fifty meters ahead on the right"). In some embodiments, the one or more indications can include information associated with the context data including whether a landmark is obstructed (e.g., "the landmark is behind the small tree on the corner"), whether the landmark is illuminated, and/or the position of the landmark with respect to other objects (e.g., "the landmark by the river").

In some embodiments, the one or more indications can include one or more visual indications (e.g., a photograph of the one or more landmarks displayed on a display device) associated with a relative location of the one or more landmarks on the path with respect to the vantage point, and/or one or more audible indications (e.g., an audible indication from a loudspeaker based on the semantic tags associated with the one or more landmarks) associated with the relative location of the one or more landmarks on the path with respect to the vantage point.

Figure 14:
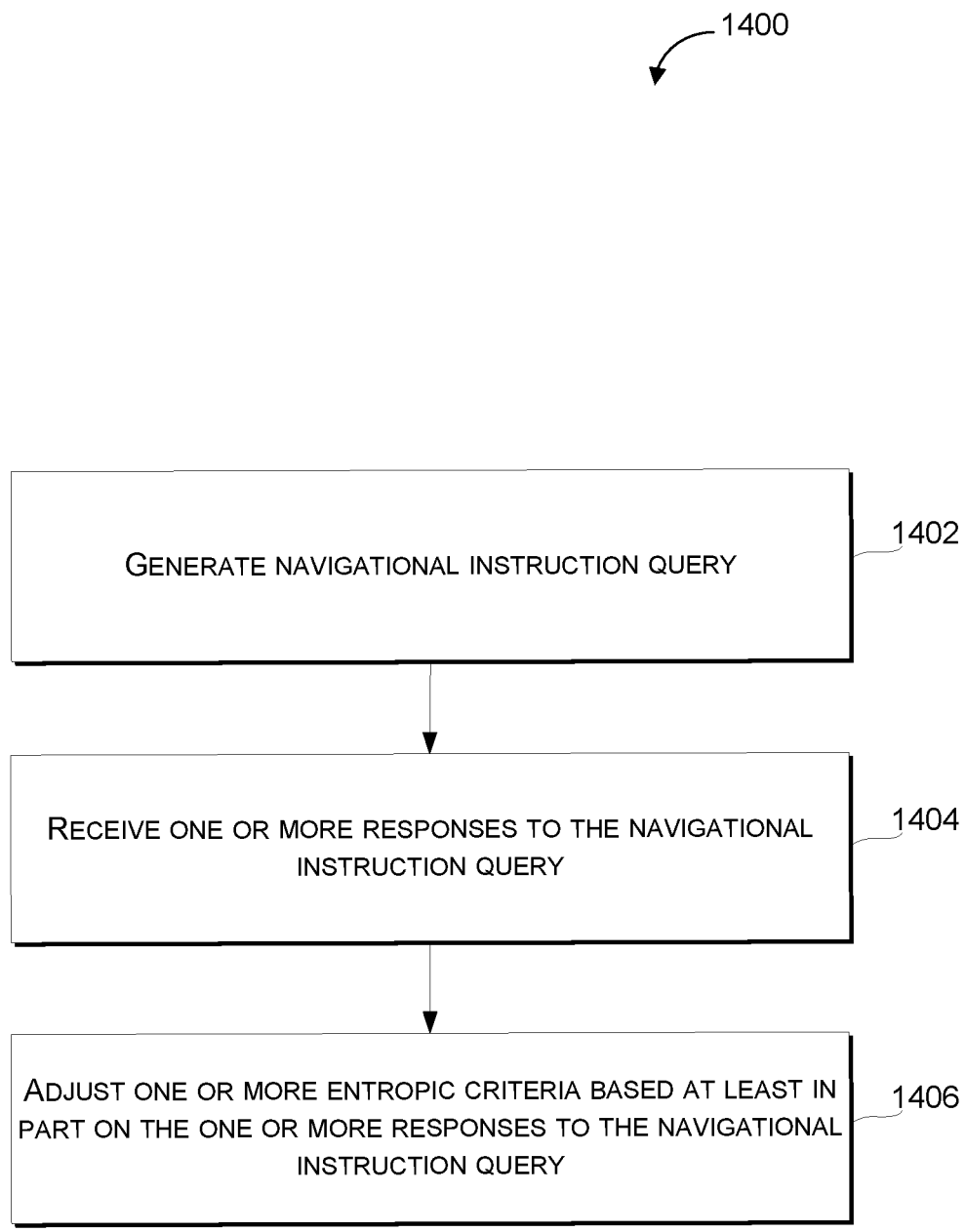
FIG. 14 depicts a flow diagram of providing navigational instructions that reference landmarks according to example embodiments of the present disclosure.

FIG. 14 depicts a flow diagram of providing navigational instructions that reference landmarks according to example embodiments of the present disclosure. One or more portions of the method 1400 can be executed or implemented on one or more computing devices or computing systems including, for example, the computing device 102, the server computing system 130, and/or the training computing system 150. Further, one or more portions of the method 1400 can be executed or implemented as an algorithm on the hardware devices or systems disclosed herein. In some embodiments, one or more portions of the method 1400 can be performed as part of the method 700 that is depicted in FIG. 7. FIG. 14 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1402, the method 1400 can include generating a navigational instruction query associated with a utility of the at least one navigational instruction. The navigational instruction query can include one or more visual indications (e.g., visual indications generated on a display device associated with the computing device 102) and/or one or more audible indications (e.g., one or more audible indications generated via an audio output device associated with the computing device 102). For example, subsequent (e.g., five seconds afterwards) to generating the at least one navigational instruction (e.g., "Turn right at the large white obelisk") the computing device 102 can generate the navigational instruction query via a loudspeaker device associated with the computing device 102. The navigational instruction query can state "Did you see the landmark?" or "Did you see the large white obelisk?" Furthermore, the navigational instruction query can, for example, inquire as to whether the at least one navigational instruction was helpful in navigation (e.g., "Was the navigational instruction helpful?").

In some embodiments, the navigational instruction query can be generated based at least in part on a distance to the at least one landmark referenced in the at least one navigational instruction. For example, the computing device 102 can be associated with one or more sensors that can be used to determine the distance to the at least one landmark and can generate the navigational instruction query when the vantage point is within a predetermined distance of the at least one landmark. By way of further example, the computing device 102 can use the distance to the at least one landmark and the current velocity at the vantage point to determine an amount of time before the landmark is within the predetermined distance. The computing device 102 can then generate the navigation instruction query within a predetermined time period of reaching the location of the at least one landmark.

At 1404, the method 1400 can include receiving one or more responses to the navigational instruction query. The one or more responses to the navigational instruction query can include one or more signals or data received from one or more devices including a tactile input device (e.g., keyboard, a touch screen, a pressure sensitive surface, and/or a button), a microphone, and/or a camera. For example, the computing device 102 can be associated with a microphone that receives one or more verbal responses from a passenger (e.g., a passenger in an automobile) that had been provided with the navigational instruction query "Did you see the landmark?" The response from the passenger can include, for example, a verbal response of "Yes" or "No." to denote whether the passenger saw the landmark.

In some embodiments, the one or more responses can be stored in a privacy enhancing way that is strongly encrypted and anonymized, so that, for example, aggregations of the one or more responses can be used to improve the efficacy of selecting landmarks and providing navigational instructions.

At 1406, the method 1400 can include adjusting the one or more entropic criteria based at least in part on the one or more responses to the navigational instruction query. For example, when the one or more responses do not affirm the utility of the at least one navigational instruction, the one or more entropic criteria can be adjusted by changing the one or more entropic criteria. For example, when the one or more entropic criteria can include a minimum height of ten meters. The minimum height can be increased to fifteen meters when the one or more responses indicate that a navigational instruction referencing a landmark that is eleven meters tall was not useful (e.g., the landmark did not assist a user in navigating to their intended destination).

By way of further example, the extent to which the one or more responses indicate the effectiveness of a navigational instruction from a particular location (e.g., the location associated with the vantage point) can be used to adjust the one or more entropic criteria so that certain entropic criteria (e.g., the brightness of a landmark) based on the one or more responses (e.g., increase the minimum brightness of a landmark at night when the landmark was not seen by a user that received a navigational instruction referencing the landmark).

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method of providing navigational instructions that reference landmarks, the method comprising:
    accessing, by a computing system comprising one or more processors, a plurality of semantic tags associated with a plurality of images, wherein each of the plurality of semantic tags is associated with one or more features depicted by one of the plurality of images, and wherein each of the one or more features is associated with a geographic location;

identifying, by the computing system, based at least in part on the plurality of semantic tags, one or more landmarks comprising the one or more features that satisfy one or more entropic criteria that measure a localized prominence of each of the one or more features, wherein the one or more entropic criteria comprise a comparison of a rate at which the one or more features occur to a lower threshold rate, wherein the rate at which the one or more features occur is at a rate below the lower threshold rate and is determined based on a number of occurrences of the feature within a distance of a navigational travel path generated by a navigational computing system;

selecting, by the computing system, based at least in part on context data associated with a location on the navigational travel path generated by the navigational computing system comprising a plurality of locations and a level of familiarity with the one or more landmarks, at least one landmark for use in navigation at the location, wherein the level of familiarity is based at least in part on a user's previous association with the one or more features of the one or more landmarks; and generating, by the computing system, at least one navigational instruction with associated text that references the at least one landmark.

2. The computer-implemented method of claim 1, wherein identifying, by the computing system, based at least in part on the plurality of semantic tags, one or more landmarks that comprise the one or more features that satisfy one or more entropic criteria comprises:

determining, by the computing system, a confidence score for each of the one or more features based at least in part on a number of times that each respective feature of the one or more features has been associated with a semantic tag of the plurality of semantic tags; and identifying as a landmark, by the computing system, the one or more features with a confidence score that satisfy one or more confidence score criteria.

3. The computer-implemented method of claim 2, wherein the confidence score is based at least in part on a number of different perspectives from which each of the one or more features associated with a semantic tag has been viewed, or a recency with which the one or more features have been associated with a semantic tag.

4. The computer-implemented method of claim 1, wherein identifying, by the computing system, based at least in part on the plurality of semantic tags, one or more landmarks that comprise the one or more features that satisfy one or more entropic criteria comprises:

determining, by the computing system, one or more clusters of the one or more features that satisfy the one or more entropic criteria, wherein each of the one or more clusters includes the one or more features that have a common semantic type.

5. The computer-implemented method of claim 1, wherein the context data comprises a vantage point associated with the location, and wherein selecting, by the computing system, based at least in part on context data associated with a location on a path comprising a plurality of locations, at least one landmark for use in navigation at the location comprises:

determining, by the computing system, a visibility of each of the one or more landmarks from the vantage point associated with the location.

6. The computer-implemented method of claim 5, wherein the visibility is based at least in part on a distance from which each of the one or more landmarks is visible from the vantage point, an amount of light that is cast on each of the one or more landmarks, any obstructions between the vantage point and the one or more landmarks, or physical dimensions of each of the one or more landmarks.

7. The computer-implemented method of claim 5, wherein determining, by the computing system, a visibility of each of the one or more landmarks from the vantage point associated with the location comprises:

determining, by the computing system, a direction of travel along the path at the vantage point; and determining, by the computing system, the one or more landmarks that face the direction of travel.

8. The computer-implemented method of claim 5, wherein determining, by the computing system, a visibility of each of the one or more landmarks from the vantage point associated with the location comprises: determining, by the computing system, the visibility based at least in part on a mode of transportation associated with the vantage point.

9. The computer-implemented method of claim 1, wherein selecting, by the computing system, based at least in part on context data associated with the location on the path comprising the plurality of locations, at least one landmark for use in navigation at the location comprises:

determining, by the computing system, a reaction time based at least in part on a velocity at the location and a distance to a closest landmark of the one or more landmarks; and determining, by the computing system, the one or more landmarks that satisfy one or more reaction time criteria associated with a minimum reaction time.

10. The computer-implemented method of claim 9, wherein the reaction time is based at least in part on a mode of transportation associated with the location, and wherein the mode of transportation comprises a motor vehicle, a bicycle, or foot travel.

11. The computer-implemented method of claim 1, wherein generating, by the computing system, the at least one navigational instruction that references the at least one landmark comprises: adjusting, by the computing system, the at least one navigational instruction based at least in part on the level of familiarity.

12. The computer-implemented method of claim 1, further comprising: generating, by the computing system, a navigational instruction utility query associated with a utility of the at least one navigational instruction; receiving, by the computing system, one or more responses to the navigational instruction utility query; and adjusting, by the computing system, the one or more entropic criteria based at least in part on the one or more responses to the navigational instruction utility query.

13. One or more tangible, non-transitory computer-readable media storing computer-readable instructions that when executed by one or more processors cause the one or more processors to perform operations, the operations comprising:

accessing image data comprising a plurality of images associated with one or more semantic tags, wherein each of the one or more semantic tags is associated with one or more features of the plurality of images, and wherein each of the one or more features is associated with a geographic location; determining one or more landmarks comprising the one or more features that satisfy one or more entropic criteria associated with a localized prominence of each of the one or more features, wherein the one or more entropic criteria comprise a comparison of a rate at which the one or more features occur to a lower threshold rate, wherein the rate at which the one or more features occur is at a rate below the lower threshold rate and is determined based on a number of occurrences of the feature within a distance of a navigational travel path generated by a navigational computing system; determining, based at least in part on context data associated with a location on the navigational travel path generated by the navigational computing system comprising a plurality of locations and a level of familiarity with the one or more landmarks, at least one landmark for use in navigation at the location, wherein the level of familiarity is based at least in part on a user's previous association with the one or more features of the one or more landmarks; and generating navigational data comprising one or more indications with associated text that references the one or more landmarks.

14. The one or more tangible, non-transitory computer-readable media of claim 13, wherein each of the one or more features is associated with a time of day, a season, a visual constancy, or one or more locations from which each of the one or more features is visible.

15. The one or more tangible, non-transitory computer-readable media of claim 13 wherein the one or more entropic criteria comprise a frequency of occurrence of each of the one or more features within a predetermined area not exceeding a predetermined threshold frequency, a temporal persistence of each of the one or more features at a location exceeding a predetermined threshold duration, or a size of each of the one or more features exceeding a threshold size.

16. A computing system comprising:
one or more processors;
one or more non-transitory computer-readable media storing instructions that when executed by the one or more processors cause the one or more processors to perform operations comprising:
accessing image data comprising a plurality of images associated with one or more semantic tags, wherein each of the one or more semantic tags is associated with one or more features of the plurality of images, and wherein each of the one or more features is associated with a geographic location;
determining one or more landmarks comprising the one or more features that satisfy one or more entropic criteria associated with a localized prominence of each of the one or more features, wherein the one or more entropic criteria comprise a comparison of a rate at which the one or more features occur to a lower threshold rate, wherein the rate at which the one or more features occur is at a rate below the lower threshold rate and is determined based on a number of occurrences of the feature within a distance of a navigational travel path generated by a navigational computing system;
determining, based at least in part on context data associated with a location on the navigational travel path generated by the navigational computing system comprising a plurality of locations and a level of familiarity with the one or more landmarks, at least one landmark for use in navigation at the location, wherein the level of familiarity is based at least in part on a user's previous association with the one or more features of the one or more landmarks; and
generating navigational data comprising one or more indications with associated text that references the one or more landmarks.

17. The computing system of claim 16, wherein the one or more indications comprise one or more visual indications associated with a relative location of the one or more landmarks on the navigational travel path with respect to a vantage point, or one or more audible indications associated with the relative location of the one or more landmarks on the path with respect to the vantage point.

18. The computing system of claim 16, wherein determining one or more landmarks comprising the one or more features that satisfy one or more entropic criteria associated with a localized prominence of each of the one or more features comprises:
determining a mode of travel associated with the navigational travel path; and
determining, based at least in part on a direction of travel and velocity along the navigational travel path, the one or more landmarks that will be visible from the navigational travel path within a predetermined time period associated with the mode of travel.

\* \* \* \* \*